US012104438B2

(12) United States Patent
Bonge, Jr.

(10) Patent No.: US 12,104,438 B2
(45) Date of Patent: Oct. 1, 2024

(54) PET DOOR SYSTEM HAVING SEMI-FLEXIBLE PET DOOR

(71) Applicant: Nicholas Jay Bonge, Jr., Ventura, CA (US)

(72) Inventor: Nicholas Jay Bonge, Jr., Ventura, CA (US)

(*) Notice: Subject to any disclaimer, the term of this patent is extended or adjusted under 35 U.S.C. 154(b) by 812 days.

(21) Appl. No.: 16/551,067

(22) Filed: Aug. 26, 2019

(65) Prior Publication Data

US 2020/0011131 A1    Jan. 9, 2020

Related U.S. Application Data

(63) Continuation-in-part of application No. 15/151,451, filed on May 10, 2016.

(51) Int. Cl.
*E06B 9/58* (2006.01)
*A01K 29/00* (2006.01)
(Continued)

(52) U.S. Cl.
CPC .............. *E06B 9/581* (2013.01); *A01K 29/00* (2013.01); *E06B 2009/6818* (2013.01); *E06B 9/72* (2013.01)

(58) Field of Classification Search
CPC .......... E06B 9/581; E06B 7/32; E06B 9/0638; E06B 9/15; E06B 2009/1583; E06B 2009/1577; E06B 2009/1505; A01K 29/00

See application file for complete search history.

(56) References Cited

U.S. PATENT DOCUMENTS

| 769,423 A | 9/1904 | Wilso |
| 2,465,423 A | 3/1949 | Bonkowski et al. |

(Continued)

FOREIGN PATENT DOCUMENTS

| EP | 3455444 A1 | 3/2019 |
| WO | 2017197011 A1 | 11/2017 |

OTHER PUBLICATIONS

International Preliminary Report on Patentability for International Application No. PCT/US17/32003, mailed May 29, 2018, 25 pages.

(Continued)

*Primary Examiner* — Abe Massad
*Assistant Examiner* — Jeremy C Ramsey
(74) *Attorney, Agent, or Firm* — Lewis Roca Rothgerber Christie LLP

(57) ABSTRACT

A pet door having a casing and a door assembly contained within the casing, the door assembly having a plurality of rotatably interlocking segments such that the door assembly is rigid in a direction along an axis of rotation of the interlocking segments and flexible along a second axis perpendicular to the axis of rotation of the interlocking segments, and a plurality of end caps for preventing horizontal sliding of individual interlocking segments, the end caps having a first surface which engages the end of the interlocking segments and a recess surface spaced away from the end of the interlocking segment to allow free rotation of the interlocking segment not engaging the first surface of the end cap. The pet door further includes a magnet positioned in the end caps which are aligned with a corresponding magnet positioned along the sides of the casing member to individually position the interlocking segments in the casing.

12 Claims, 22 Drawing Sheets

(51) Int. Cl.
*E06B 9/68* (2006.01)
*E06B 9/72* (2006.01)

(56) References Cited

U.S. PATENT DOCUMENTS

| | | | |
|---|---|---|---|
| 4,343,340 A * | 8/1982 | Paule | E06B 9/582 |
| | | | 57/902 |
| 4,641,896 A | 2/1987 | Iimura et al. | |
| 4,760,622 A | 8/1988 | Rohrman | |
| 5,975,185 A | 11/1999 | Miller et al. | |
| 6,141,911 A | 11/2000 | Reid | |
| 6,725,806 B1 * | 4/2004 | Gribble | E06B 7/32 |
| | | | 119/484 |
| 7,784,430 B1 | 8/2010 | Thorne et al. | |
| RE41,629 E | 9/2010 | Bonge, Jr. | |
| 8,074,606 B1 | 12/2011 | Schrey et al. | |
| 9,003,705 B1 | 4/2015 | Solowiej | |
| 2003/0024659 A1 | 2/2003 | Begni | |
| 2005/0284402 A1 | 12/2005 | Becker | |
| 2006/0101738 A1 * | 5/2006 | Lethers | E06B 7/32 |
| | | | 52/204.51 |
| 2007/0234643 A1 | 10/2007 | Siegal et al. | |
| 2008/0036611 A1 | 2/2008 | Noblitt | |
| 2008/0184625 A1 | 8/2008 | Bjorholm | |
| 2008/0184940 A1 * | 8/2008 | Bosserdet | E06B 7/32 |
| | | | 49/58 |
| 2009/0151879 A1 | 6/2009 | Walti et al. | |
| 2011/0146920 A1 | 6/2011 | Mazej et al. | |
| 2011/0265959 A1 | 11/2011 | Frede | |
| 2013/0036672 A1 | 2/2013 | Westerfield | |
| 2013/0305609 A1 | 11/2013 | Graves | |
| 2014/0090299 A1 | 4/2014 | Brown | |
| 2016/0222720 A1 | 8/2016 | Tamberino et al. | |
| 2017/0211312 A1 * | 7/2017 | Gagner | E06B 7/21 |
| 2017/0328126 A1 | 11/2017 | Bonge, Jr. | |
| 2019/0323286 A1 * | 10/2019 | Menendez | E06B 9/42 |

OTHER PUBLICATIONS

International Search Report and Written Opinion for International Application No. PCT/US17/32003, mailed Aug. 11. 2017, 10 pages.
Partial Supplementary European Search Report issued in parallel European Application No. EP 17 79 6784, mailed on May 8, 2019, 13 pages.
Office action issued in parallel Canadian Application No. 3,022,938, dated Sep. 13, 2019, 3 pages.

* cited by examiner

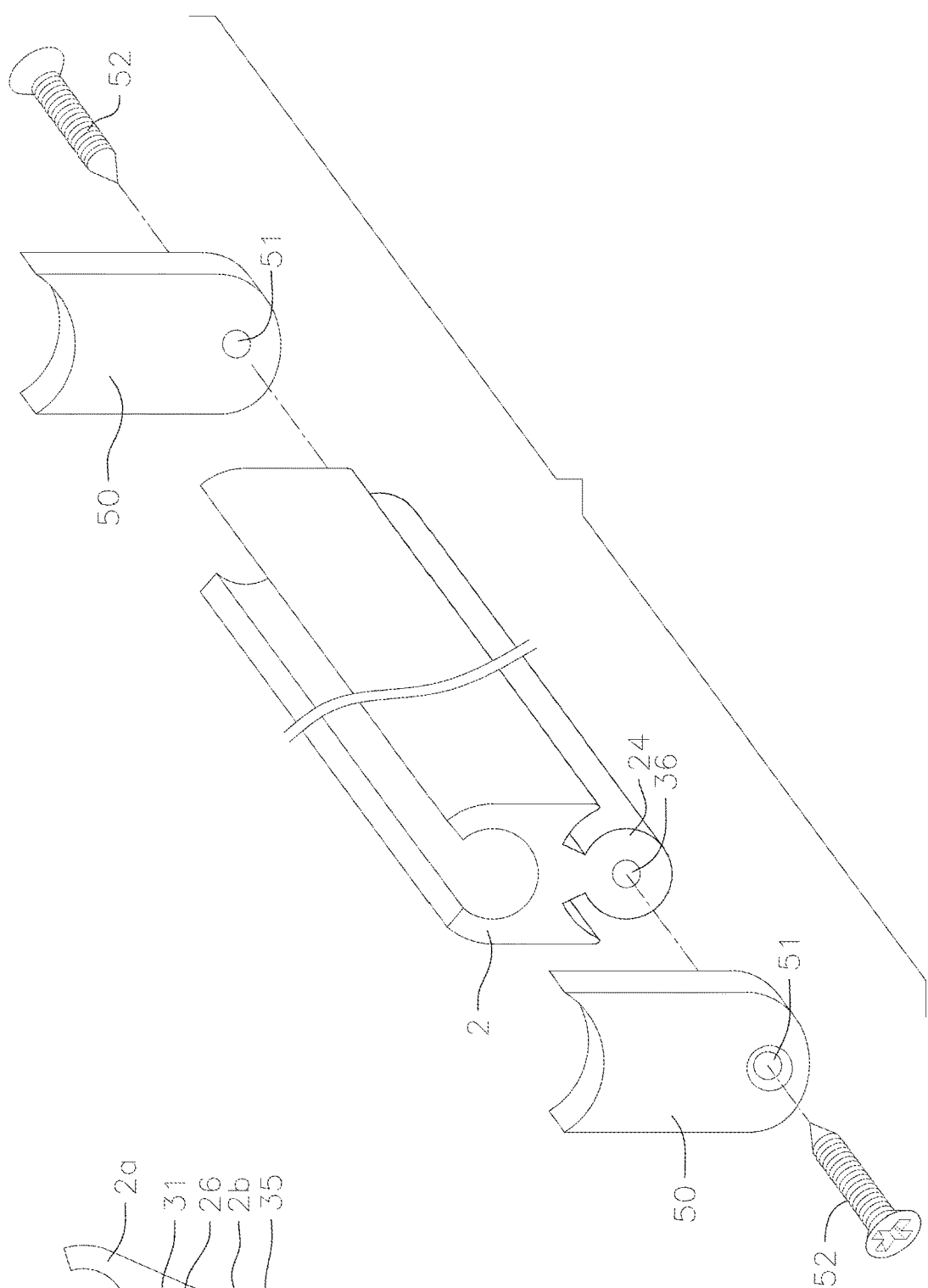

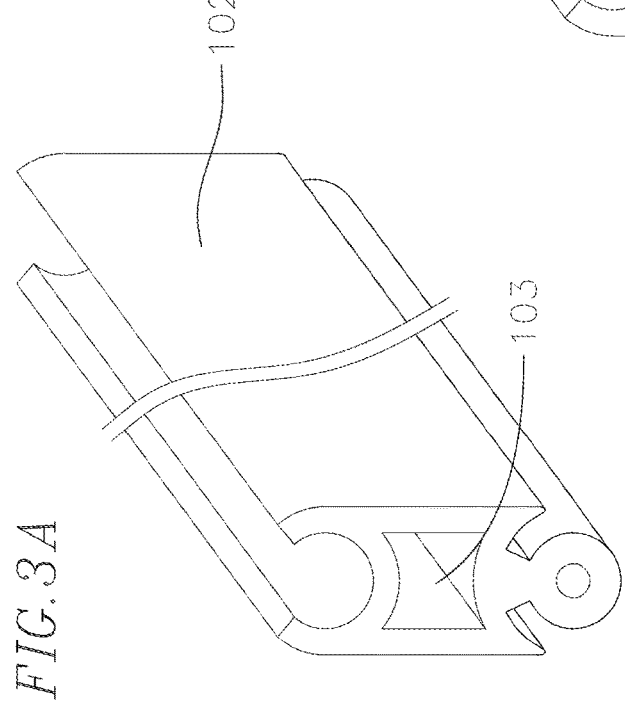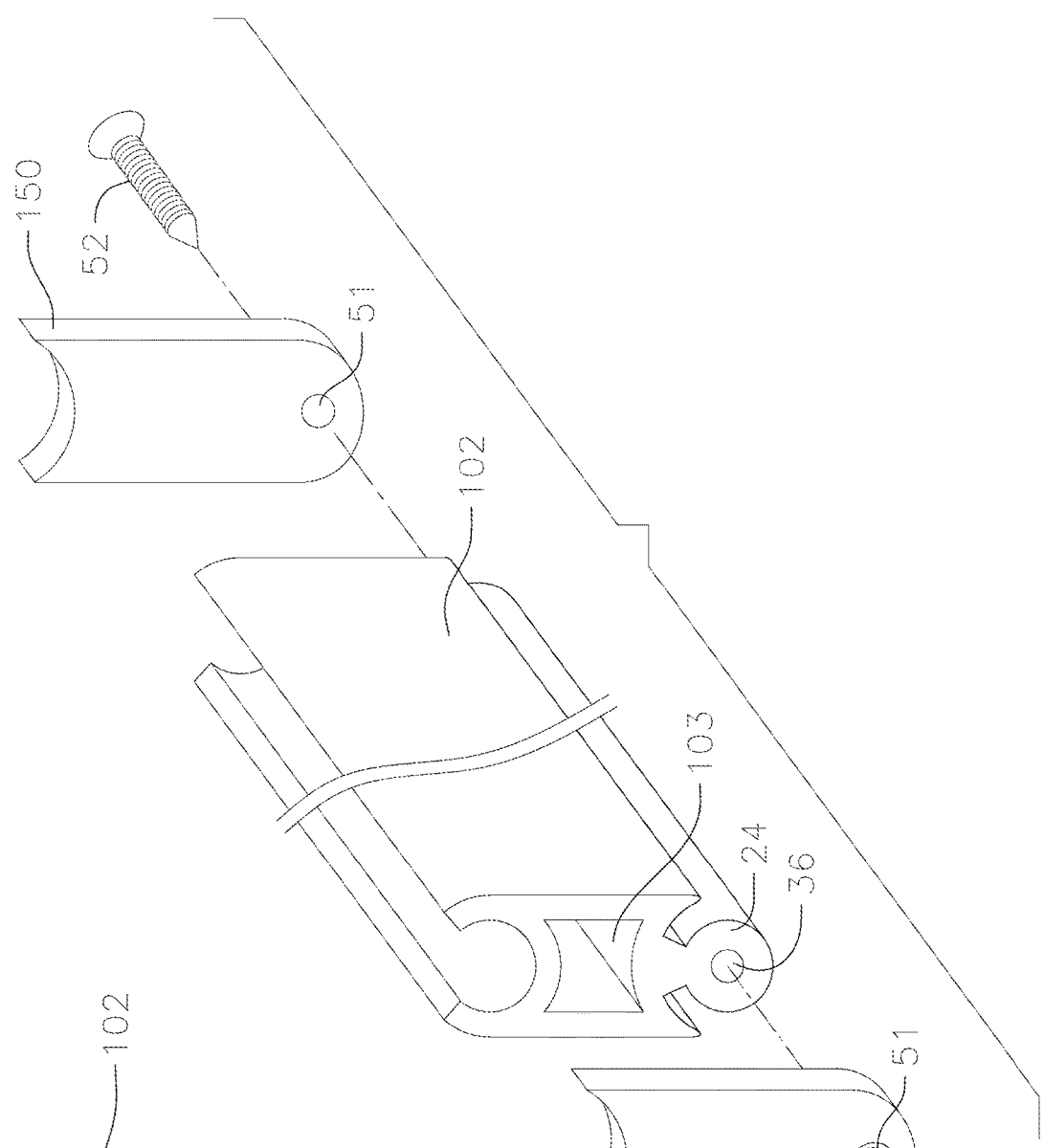

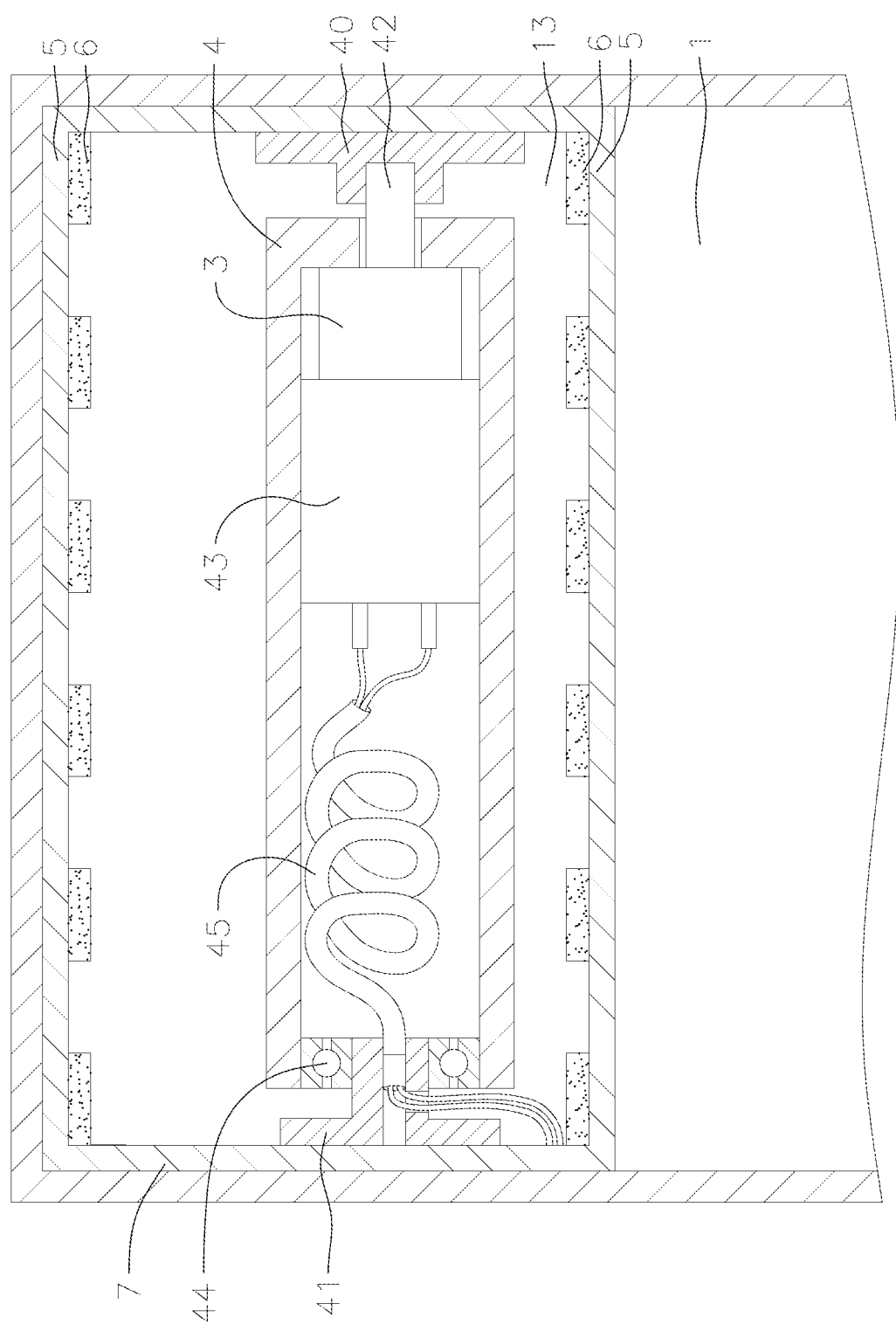

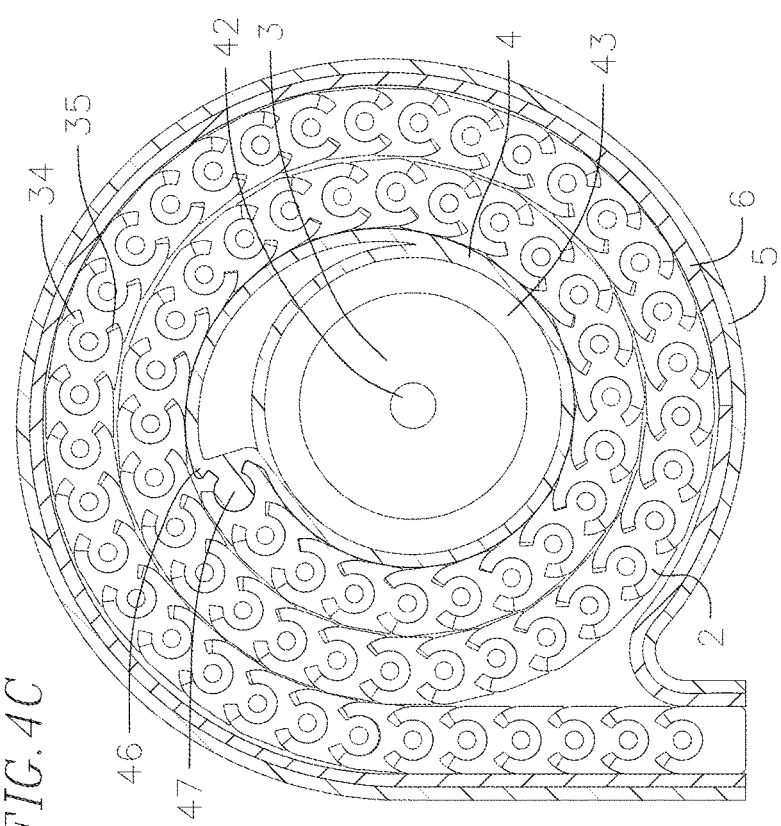
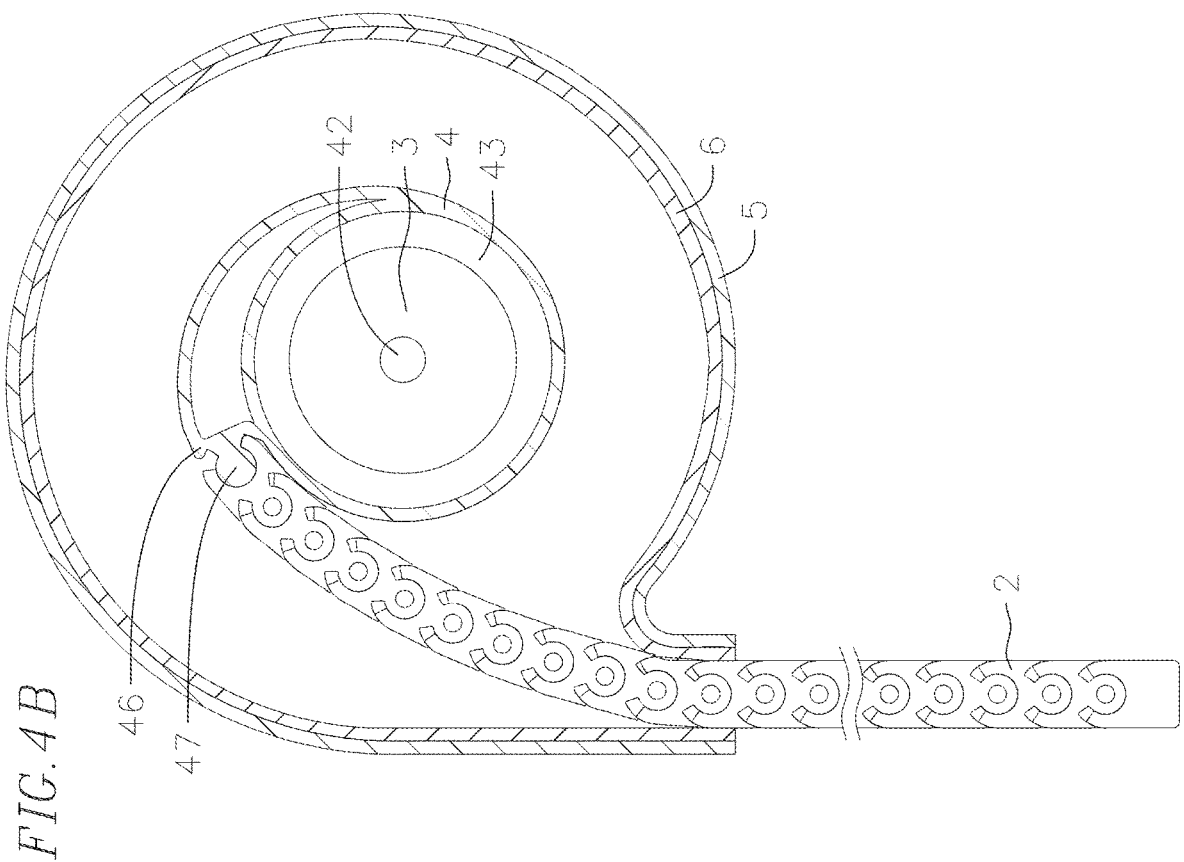
FIG. 4B
FIG. 4C

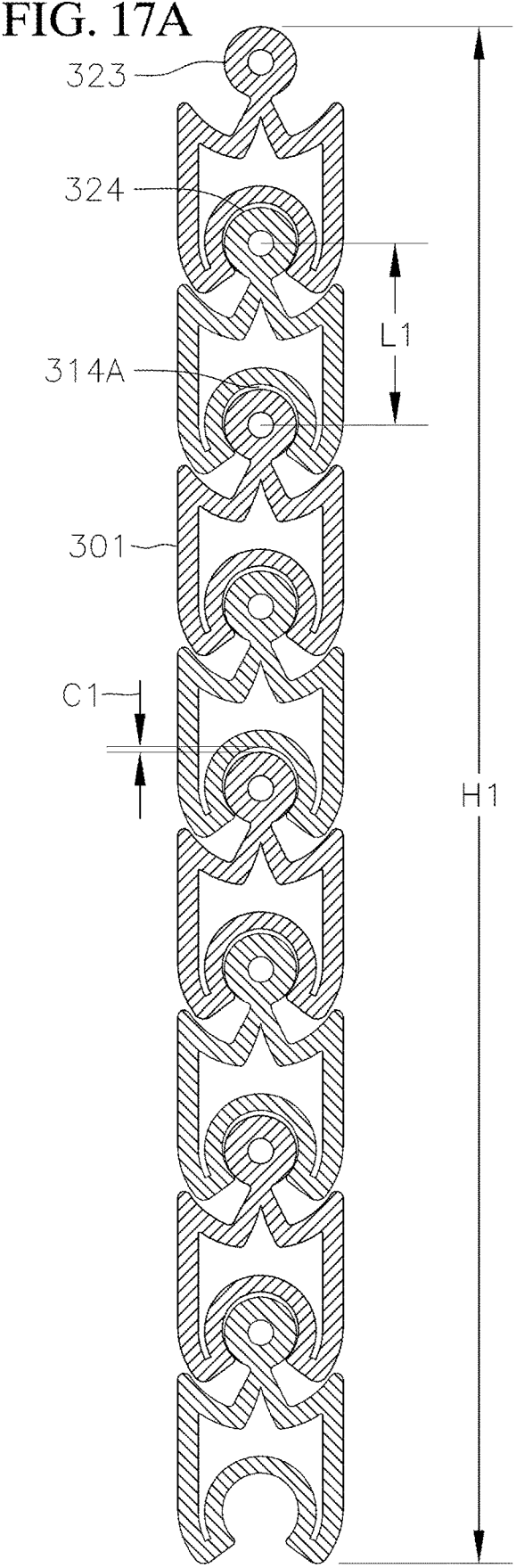
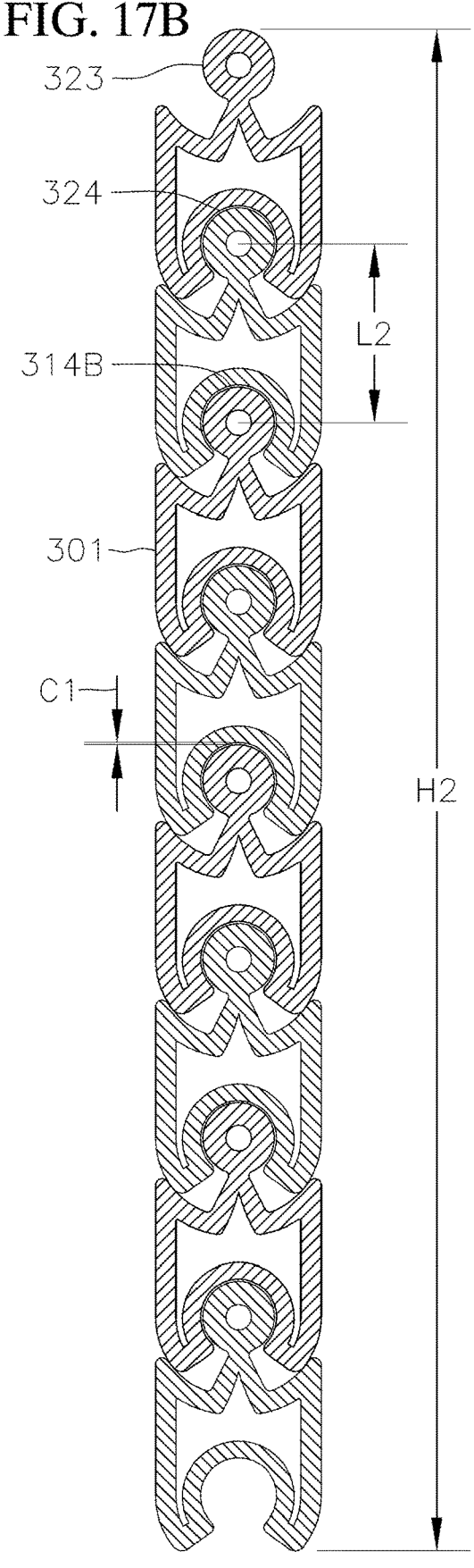

PET DOOR SYSTEM HAVING SEMI-FLEXIBLE PET DOOR

CROSS-REFERENCE TO RELATED APPLICATIONS

This application is a continuation-in-part of U.S. patent application Ser. No. 15/151,451, filed May 10, 2016, the disclosures of which are hereby incorporated by reference in their entirety.

BACKGROUND

Conventional pet doors generally fall into the categories of manual or electronic. Manual pet doors may further be divided into types that use flexible flaps (such as vinyl flaps) and others that use rigid flaps (such as transparent hard plastic or metal flaps). Manual pet door flaps allow a pet to freely move in and out. However, manual pet doors with rigid flap types have the disadvantage that they may injure the pet should the pet go part way through the opening and then back up. In such a case case, the rigid flap may pinch the animal's back or tail. Flexible flaps do not suffer this deficiency; however, they are difficult to seal because the flexible flap is unable to apply compressive force on a peripheral seal and are easily moved by wind creating gaps between the flap and the casing of the flap allowing air to draft into the home. In addition, such manual flaps are not exclusive to a particular pet or pets. Wild animals or even human intruders may be able to enter through the pet door, providing a notable security risk.

Electronic pet doors typically employ rigid flaps or panels and are operated by a pet worn device that may either unlock the flap, requiring the pet to push it open or it may engage a motor to lift a panel, thus requiring no effort on the part of the pet. An example of a manufactured motor-driven pet door is illustrated in U.S. Pat. No. RE41629 to the current inventor, embodiments of which disclose a pet door system operated by a pet-worn activation device and a motor which lifts a door panel by means of a cable and spool. Some embodiments of this invention also include a locking mechanism to prevent the panel from being movable by an intruder.

Motor-driven pet doors are generally well sealed because the rigid door is typically guided within grooves that prevent air from leaking from one side of the flap to the other. However, these units can require a great amount of vertical space since the door panel must be lifted above the opening resulting in a space requirement of twice the door panel height plus the space required by the casing and drive mechanism. This space requirement limits the locations in which the pet door can be installed.

A purpose of the inventive pet door system is to provide an improved pet door system including a flexible pet door that addresses one or more of the above problems. For example, embodiments of the present invention are directed to a manual pet door which is well sealed against drafts and which poses no risk of injury to the pet should it decide to back up after moving part way through the opening. Other embodiments are directed to a motor-driven pet door that does not require a significant amount of space above the opening.

SUMMARY

Embodiments of the current invention employ a door made of interlocking segments which may rotate about a horizontal (or substantially horizontal) axis relative to each other. The door segments are generally long and narrow, running along the width of the pet door opening. They are therefore flexible in the vertical direction (or a substantially vertical direction) and rigid or substantially rigid in the horizontal direction (or substantially horizontal direction). The interlocking design of the segments prevents air flow between the segments. In some embodiments, the door segments can be flexible in the horizontal direction (or substantially horizontal direction).

In some embodiments, the interlocking, segmented design is employed in a motor-driven pet door by allowing the segments door to wind around a motor-driven cylinder, saving significant space above the pet door opening as compared to conventional doors.

In other embodiments, the pet door works as a flap to allow entry and exit of the pet. In these embodiments, the vertical flexibility can also allow the door to roll backward should the pet decide to back up, eliminating the danger of pinching. In addition, the horizontal rigidity of the door segments allows compressive pressure to be applied to peripheral seals along the sides of the opening while the flap is held in place by magnets sized to apply force sufficient to hold the flap in a closed position against the force of wind, but easily overcome by the force of a small animal (such as a pet) pressing against the flap to allow it to pass through the opening.

Embodiments of the pet door system include a casing configured to attach the pet door system to a building and a segmented door attached to the casing. The segmented door includes a plurality of interlocking segments that are rotatable with respect to each other. An end cap with stepped surfaces allowing a firm connection to a first door segment while allowing space for a second interlocking door segment to freely pivot with respect to the first door segment is incorporated. The pet door system also includes means for magnetically positioning some or all of the door segments such that the positioning is independent of gravity and independent of the contact of one door segment to another thus, eliminating the accumulation of manufacturing tolerances of the door segments in establishing an overall height of the door segment assembly in the closed position. A precise dimension of the height of the door assembly in the closed position may be achieved within the manufacturing tolerances of the single bottom door segment. A means to adjust the overall height of the door assembly is achieved by an adjustable element placed within the bottom door segment or another door segment.

Another feature of the pet door system is that since the door segments are interlocking there is no need to allow the topmost door segment to pivot with respect to the top housing member. Mounting the topmost door segment rigidly with respect to the top housing door segment eliminates the need for pivoting and sealing means incorporated in other embodiments.

BRIEF DESCRIPTION OF THE DRAWINGS

Further features and advantages of the invention will become apparent from and will be best understood by reference to the following detailed description reviewed in conjunction with the description of embodiments by means of the accompanying drawings. In the drawings:

FIG. 2C illustrates an end view of the side end portions of the individual door segments of FIG. 2B, in which the individual door segments have been rotated.

FIG. 2D illustrates an exploded perspective view of the individual door segment of FIG. 2A and its respective end caps.

FIG. 3A illustrates a perspective view of a side portion of an individual door segment of the segmented door of FIG. 1, according to another embodiment.

FIG. 3B illustrates an exploded perspective view of the individual door segment of FIG. 3A and its respective end caps.

FIG. 4A is a sectional front view of a coil chamber of the pet door system of FIG. 1.

FIG. 4B shows a cross-sectional view of the coil chamber when the segmented door is closed and not wrapped around a rotating cylinder.

FIG. 4C shows a cross-sectional view of the coil chamber when the segmented door is open and wrapped around the rotating cylinder.

FIG. 17A is a cross-sectional view of interlocking door segments without magnetic alignment.

FIG. 17B is a cross-sectional view of interlocking door segments with magnetic alignment.

DETAILED DESCRIPTION

Embodiments of the present invention describe a pet door system including a flexible door. These embodiments may include a novel pet door design comprised of interlocking pivoting strips/bar-like segments which provide flexibility along the door's vertical axis while maintaining rigidity or substantial rigidity along its longitudinal axis. The door may be sealed at its ends with a compression seal (e.g., an end cap), which may be compressed by reason of the door's longitudinal rigidity.

In some embodiments, the flexible segmented door is motor driven for fully automatic operation and may be movable in an upward direction in response to a remote signal, such as an ultrasonic transmitter worn by a pet. During its upward movement, the segmented door may be rolled up or coiled around a rotating cylinder. The flexible nature of the door allows it to be wound. Because the segmented door can be wound into a roll, these embodiments of the inventive pet door system require less vertical height than conventional pet door systems having a rigid pet door panel that translates upwardly. In other embodiments, the segmented door is configured to swing open and is moveable in a forward and backward direction so that a pet may physically push the flexible segmented door in order to move through the pet door. Embodiments of the present invention may also include a novel locking mechanism to prevent the entry of intruders through the pet door.

Figure 1:
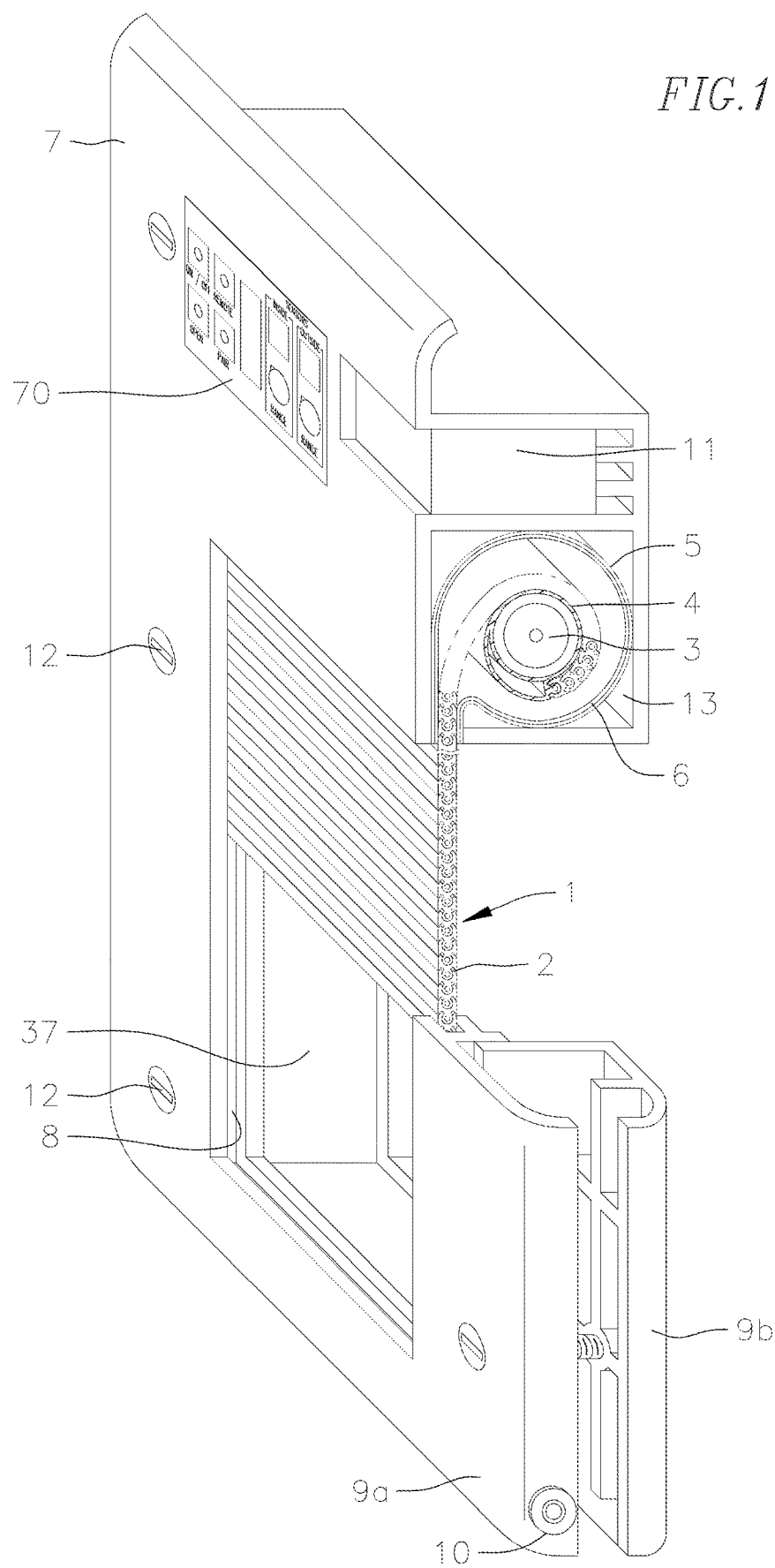
FIG. 1 illustrates a partially cut-away perspective view of an embodiment of a pet door system including a segmented door.

FIG. 1 illustrates a partially cut-away perspective view of an embodiment of the pet door system. The pet door system includes a segmented door 1 that comprises multiple individual door segments 2. The door segments 2 are rigid or substantially rigid and run along the horizontal length of the door 1. In other embodiments, the door segments 2 need not be horizontally rigid and may be flexible in the horizontal direction. The segments 2 have interlocking shapes, such can be seen in FIGS. 2A-3B. The interlocking shape of the door segments 2 allow the segments 2 to rotate about a horizontal axis (or a substantially horizontal direction) relative to each other, permitting the door 1 to be flexible in the vertical (or substantially vertical) direction, while maintaining relative rigidity in the horizontal (or substantially horizontal) direction. The door segments 2 can be made of a rigid material, such as an extruded or molded plastic, aluminum or other metal or resin. Each of the door segments 2 have a length between their two side end portions that is equal to the width of the segmented door 1.

The segmented door 1 is housed in a casing 7 along with all other elements of the pet door system. In this embodiment, the casing 7 surrounds the entire segmented door 1. However, in other embodiments, the casing 7 may only partially surround the door 1. The casing 7 includes two outside frames or bezels 9a, 9b that attach to opposite sides of a door or wall of a building (e.g., as the door or wall of a house or apartment) and the bezels 9a, 9b are shaped such that they interlock and can be fixed together, for example by an attachment means, such as screws 12. The bezels 9a, 9b define a door opening 37 into which the segmented door 1 is movably mounted. The casing 7 also includes guiding grooves 8 which guide and hold the segmented door 1 vertically along its upward/downward path when the segmented door 1 is opening and closing. The guiding grooves 8 also hold the door 1 in a vertical position when closed and prevent the door from forward and backward movement out of the casing 7. Casing 7 may be made of wood moldings, or can be made from aluminum or other metals or plastic materials.

The casing 7 includes a coil chamber 13 that houses the segmented door 1 when the door 1 is in an open position. However, when the segmented door 1 is in the open position, a lower portion of the door 1 may still be held in the guiding groove 8 to facilitate closing the door 1. A motor 43 (seen in FIG. 4) and a gear head 3 are within the coil chamber 13 and drive the rotation of a rotating cylinder 4 to open the segmented door 1. The gear head 3 may gear down the motor 43 to allow the rotating cylinder 4 to rotate more slowly with a higher torque. When the gear head 3 and motor 43 are operating to open the door 1, the rotating cylinder 4 rotates (in this embodiment, the rotating cylinder 4 rotates in a clockwise direction when viewed as shown in FIG. 1) causing the segmented door 1 to wrap around the rotating cylinder 4. The wrapping of the segmented door 1 around the rotating cylinder 4 is guided by a guide 5. The inside surface of the guide 5 may be lined with a seal 6, for example a seal 6 made of felt, to prevent the door 1 from rubbing against the guide 5, to reduce noise, and/or to inhibit leakage of air from one side of door 1 to the other. The felt seal 6 may include several felt strips, as shown for example in FIG. 4A. In other embodiments, the felt seal 6 may include a single or multiple pieces of felt or may instead include flexible fluorocarbon (Teflon) pads.

When the gear head 3 and motor 43 are operating to close the door, the rotating cylinder 4 rotates (in this embodiment, in a counterclockwise direction when viewed as shown in FIG. 1) and the segmented door 1 unwinds from the rotating cylinder 4 and lowers while being guided in the guiding grooves 8 to close the door 1.

The gear head 3 and motor 43 may be powered by electrical current from the building into which the pet door system is installed. For example, the pet door system may have a power plug 10 that electrically connects the gear head 3 and motor 43 to the building's electrical power system. The pet door system may also include a battery 11 that provides back-up power to the pet door system when electrical power is not being received from the building. However, in other embodiments, the battery 11 may not be included or the pet door system may be entirely powered by battery power without the pet door system needing to be connected to the building's electrical power system.

The pet door system may include a locking mechanism to lock the segmented door 1 in the closed position in order to prevent or hinder intruders from forcing the door 1 open. The locking mechanism may be a solenoid control, for example the solenoid lock described with reference to FIG. 5 below, an electromechanical lock, or a mechanical lock, including, for example, the mechanical lock described with reference to FIG. 10 below, that is capable of locking the segmented door 1 when the door 1 is at the bottom of the door opening 37 (i.e., in the closed position). The pet door system may also include a control panel 70, described in detail with respect to FIG. 7 below.

Figure 2A:
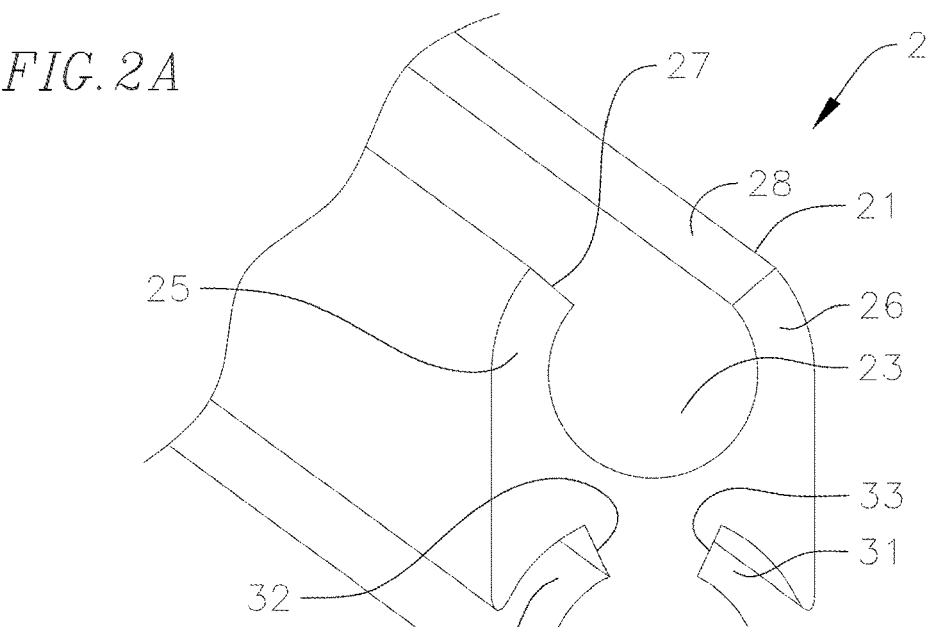
FIG. 2A illustrates a perspective view of a side end portion of an individual door segment of the segmented door of FIG. 1, according to one embodiment.

FIG. 2A illustrates a perspective view of a side end portion of an individual door segment 2 of the segmented door 1, according to one embodiment. The individual segment 2 includes a curved recess 23 at a first end 21 and a curved projection 24 at an opposite second end 22. The curved recess 23 defines two free legs 25, 26 at opposite sides of the recess 23. The free legs 25, 26 each have an angled wall 27, 28 at the first end 21 that flank the curved recess 23. The curved recess 23 is shaped and sized to complement the shape and size of the curved projection 24. In this embodiment, the curved projection 24 and recess 23 have a cylindrical shape; however, other curved shapes may also be implemented. At the portion of the curved projection 24 farthest the second end 22, there are two grooves 30, 31 that are shaped and sized to correspond to the ends of the two free legs 25, 26. The grooves 30, 31 each include an angled wall 32, 33. The curved projection 24 may also have a hollow portion 36, as shown in FIG. 2A, or the curved projection may be solid. The curved recess 23 and curved projection 24 are shaped such that when the curved projection 24 of a first individual door segment is installed within the curved recess 23 of a second individual door segment, as shown in FIG. 2B, the two door segments are connected to each other and the curved projection 24 of one segment 2a can rotate in the curved groove 23 of a second segment 2b.

Figure 2B:
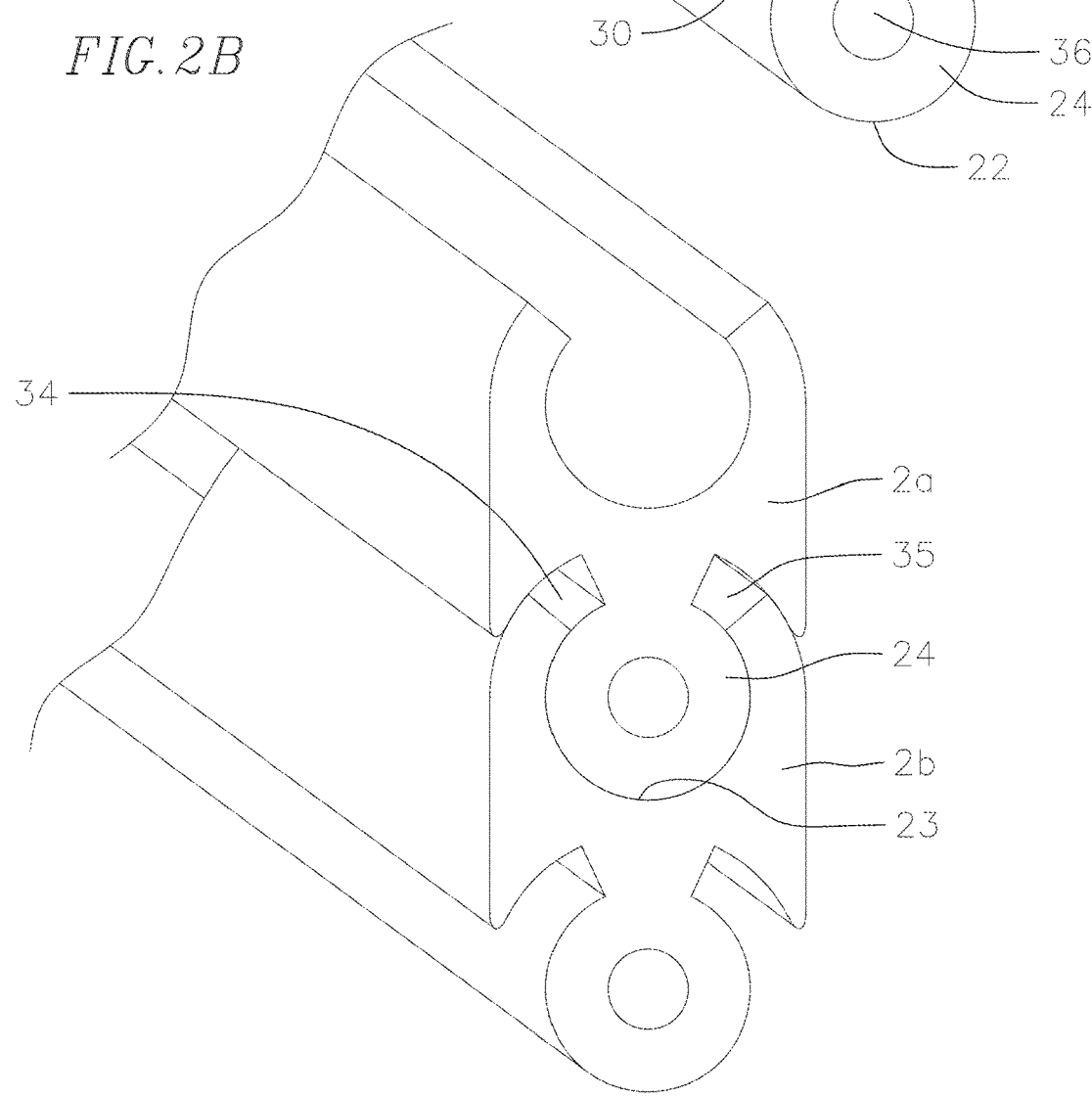
FIG. 2B illustrates a perspective view of side end portions of individual door segments of the segmented door connected together, according to the embodiment of FIG. 2A.

FIG. 2B illustrates a perspective view of side end portions of individual door segments 2a, 2b of the segmented door 1 connected together. The curved projection 24 of the first door segment 2a is installed in the curved recess 23 of the second door segment 2b. In this installed configuration, the two door segments 2a, 2b are connected such that the first door segment 2a will not disconnect from the second door segment 2b in a vertical direction; however, the first door segment 2a and the second door segment 2b can rotate along a horizontal axis with respect to one another. Gaps 34, 35 define the amount by which the first door segment 2a and the second door segment 2b can rotate with respect to one another.

As shown in FIG. 2C, the first door segment 2a can rotate clockwise in an amount equal to the gap 35, such that the gap 35 disappears. On the opposite side, the gap 34 will increase by the amount by which the gap 35 is reduced. If the first segment 2a is rotated counterclockwise, gap 34 will be reduced and gap 35 will increase in size. The grooves 30, 31 of the first segment 2a may be sized such that when the first door segment 2a is rotated to its fullest degree in either the clockwise or counterclockwise direction, the free legs 25, 26 of the second door segment 2b will still be partially in the grooves 30, 31 to prevent the first and second segments 2a, 2b from disconnecting. However, this feature is not necessary in all embodiments and in some embodiments, the free legs 25, 26 may not be in the grooves 30, 31 when the first door segment 2a is rotated to its fullest degree, as shown in FIG. 2C.

The door segments 2a, 2b can be connected together by sliding the curved projection 22 of the first door segment 2a into the curved groove 21 of the second door segment 2b through the side end portion of the first door segment 2a. Because the door segments have the same shape, manufacturing costs can be keep low because only a single shape need be extruded during manufacturing. However, while the segmented door 1 is described as having segments 2 with respect to this embodiment, the door 1 need not be segmented as long as the door is sufficiently flexible to allow winding of the door 1 around the rotating cylinder 4, such as by having a door made of a flexible vinyl or plastic flap.

As shown in FIG. 2D, the individual segment 2 may have end caps 50 that can be attached to opposite side ends of the individual segment 2 after the individual segments 2 are connected to form the segmented door 1. The end caps 50 prevent the individual segments 2 from sliding laterally relative to one another by preventing the curved projection 24 of one individual segment 2 from sliding relative to the curved recess 23 into which it is inserted. In other words, the end caps 50 act as peripheral seals that apply compressive pressure to hold the individual segments 2 of the door 1 together. The end caps 50 have an opening 51 (e.g., a hole 51) that aligns with the hollow portion 36 of the projection 24. The end caps 50 may be affixed to the individual segments via an attachment means, such as a screw 52 that connects the end cap 50 to the individual segment 2 by passing through the hole 51 into the hollow portion 36 of the projection 24.

However, end caps 50 are may not be necessary in all embodiments. In the embodiment of FIG. 1, lateral movement of the segments is substantially limited during operation by the grooves 8; thus, strong, compressing end caps may not be necessary. In some embodiments, a flexible tape can be adhered to the inside wall of the segmented door of FIG. 1 (the inside wall being the wall of the door 1 between the side ends that is wound closest to the rotating cylinder 4 during opening of the door 1). Such a flexible tape can be thin enough not to inhibit winding of the door during use and may prevent lateral movement of the segments 2. In some embodiments, the flexible tape may be adhered to the portion of the inside wall that is in the grooves 8.

FIG. 3A illustrates a perspective view of a side portion of an individual segment 102 of the segmented door, according to another embodiment. The individual segment of FIG. 3A is similar to the individual door segments 2a, 2b of FIGS. 2A-2C, except that it further includes a hollow channel 103 within the individual segment 102 that causes the individual segment 102 to have an elongated shape. Various shapes can be used to define the shape of the hollow channel 103. While the hollow channel 103 is beneficial by providing an elongated shape without substantially increasing the weight of the door segment, other embodiments with an elongated shape may have a solid or partially hollow portion instead. However, the elongated shape of the door segment 102 increases the winding radius of the segmented door 1 as it is wound around the rotating cylinder 4. Thus, for the embodiment of FIG. 1, while the door segment 102 may be used, it is beneficial to have door segments with low height profiles to reduce the size of rotating cylinder 4 and hence the size of the coil chamber 13 needed to house the door 1 when it is in the open position.

FIG. 3B illustrates end caps 150, which are similar to the end caps 50 shown in FIG. 2D.

FIG. 4A is a sectional front view of the coil chamber 13 of the pet door system. In the rotating cylinder 4 in the coil chamber 13, the gear head 3 and motor 43 is held in position by bushings 40, 41 and motor shaft 42. The gear head 3 and motor 43 are rigidly fixed to the rotating cylinder 4 and are rotatably attached to the motor shaft 42. The gear head 3 includes internal bearings to allow it to rotate relative to the motor shaft 42. The rotating cylinder 4 can include ball bearings 44 which allows cylinder 4 to rotate relative to guide 5. The rotating cylinder 4 also contains coiled wiring 45 electrically connected to the motor 43 in order to power the motor 43 to drive the gear head 3. The coiled wiring 45 may include a casing that houses multiple individual wires, such as two wires as shown in FIG. 4A, that are attached to the motor 43. The coiled wiring has a sufficient number of coils to account for the number of times the rotating cylinder 4 will rotate in order to open and close the segmented door 1 so that the wiring 45 does not break during operation. For example, in the embodiment of FIG. 4A, the coiled wiring 45 is coiled 2.5 to three times. In some embodiments, the coiled wiring 45 will uncoil as the door 1 is opening, resulting in the wiring 45 being uncoiled when the door 1 is fully open. In other embodiments, the opening of the door 1 will cause the wiring 45 to coil, and the wiring 45 will be uncoiled when the door 1 is closed.

FIGS. 4B and 4C show cross-sectional views of the coil chamber 13 when the segmented door 1 is closed and not wrapped around the rotating cylinder 4 and when the segmented door 1 is open and wrapped around the rotating cylinder 4, respectively. The rotating cylinder 4 has a partially spiral shape that complements the shape of the segmented door 1 when the door 1 is wound around the rotating cylinder 4, as best seen in FIG. 4C. The shape of the rotating cylinder 4 allows the smooth winding and unwinding of the segmented door 1 during operation. The rotating cylinder 4 also includes a wall 46 with a projection 47 that has the same or substantially the same shape and size as the projection 24 of the individual segments 2. The projection 47 attaches to the top individual segment 2 of the segmented door 1 to attached the segmented door 1 to the rotating cylinder 4.

Figure 5:
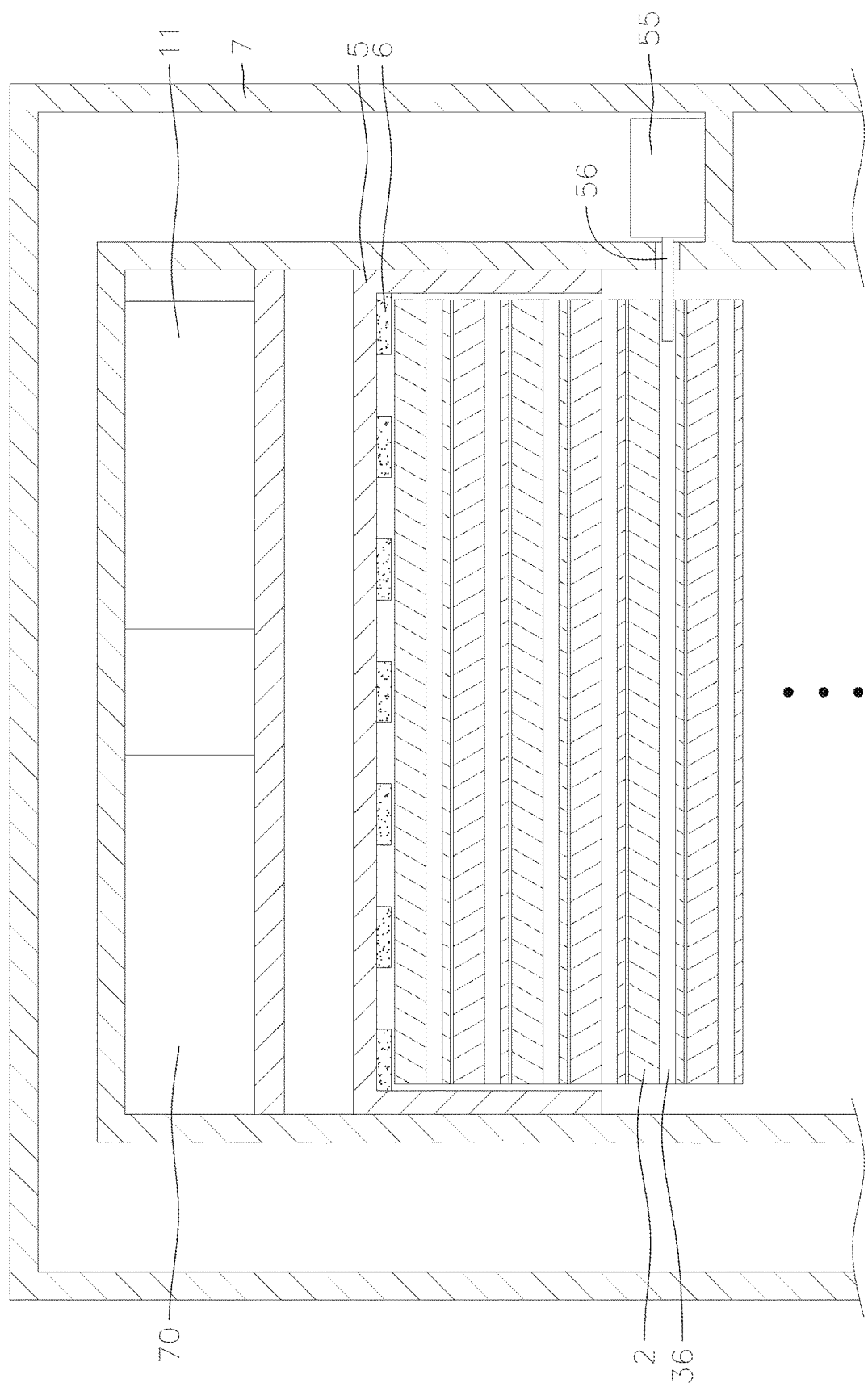
FIG. 5 is a sectional front view of a locking mechanism for the pet door system of FIG. 1.

FIG. 5 is a sectional front view of a solenoid locking mechanism for the pet door system. The solenoid locking mechanism includes a solenoid 55 having a linear actuator 56 that moves linearly within the solenoid 2 and that can project from the solenoid 55 into the hollow portion 36 of one of the door segments 2, acting as a locking pin when fully extended. The solenoid may be placed at any location along the length of the door 1 at which it has access to one of the hollow portions 36. In this embodiment, the solenoid is located in the casing 7 below the coil chamber 5.

The solenoid 55 may be electrically connected to a switch 62 (as discussed in FIG. 6 below) that indicates when the door 1 is closed, such that the solenoid 55 is automatically activated to lock the door 1 when the door 1 is in the closed position. When activated, a magnetic coil within the solenoid 55 causes the linear actuator 56 to move outwardly from the solenoid 55, causing the linear actuator 56 to advance through an opening in the casing 7 and into the hollow portion 36 of the adjacent door segment 2, thereby locking the door 1. Alternatively, one of the segments 2 may be made to be shorter than the other segments forming a gap into which the linear actuator 56 may move to lock the door 2. The solenoid locking mechanism can be configured such that the locked position, when the linear actuator 56 is projecting into the adjacent hollow portion 36 of the door 1, is the default position of the locking mechanism and it requires power to move the linear actuator 56 to an unlocked position.

The solenoid 55 may also be electrically connected to a sensor or sensors 60 (as discussed in FIG. 6 below) that are triggered when the door 1 is going to open. The solenoid 55 will remain in the locked position until the sensors 60 are triggered. When the sensors 60 are triggered, they will activate the magnetic coil within the solenoid 55 to cause the linear actuator 56 to be retracted from the hollow portion 36 of the door segment 2, thus unlocking the door 1.

Figure 6:
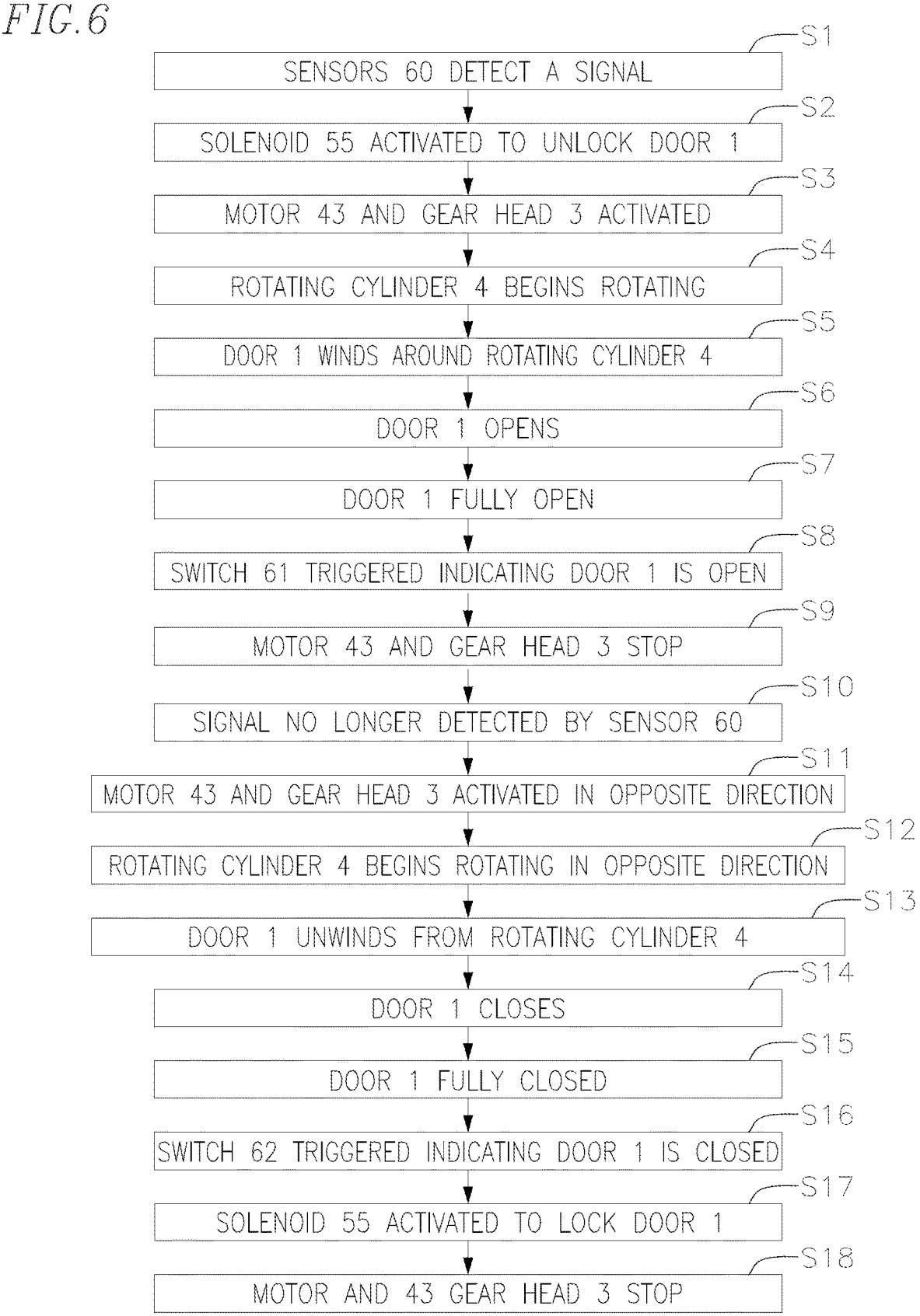
FIG. 6 is a flowchart of the operation of the pet door system.

FIG. 6 is a flowchart of the operation of the pet door system. As shown in FIG. 6, the pet door system includes sensors 60 that are capable of detecting a signal from a device worn by an animal, such as a pet collar. The sensors 60 may detect ultrasonic signals, for example, ultrasonic signals output by an ultrasonic transmitter worn by a domestic animal as described in detail in U.S. Pat. No. RE41,629, the entirety of which is incorporated herein by reference. In other embodiments, the sensors 60 may detect magnetic, radio, such as Bluetooth or RFID, or other signals that correspond to a signal transmitted by a transmitter located with the domestic animal that will be using the pet door system. When the sensors 60 detect a signal (S1), the sensor will activate the solenoid 55 to unlock the segmented door 1 (S2) and will activate the motor 43 to drive the gear head 3 to rotate (S3), in this example, in a clockwise direction. The gear head 3 in turn causes the rotating cylinder 4 to rotate clockwise (S4). As the rotating cylinder 4 rotates, the segmented door 1 is wound around the rotating cylinder 4 (S5), removing the segmented door 1 from the door opening 37 and thus, opening the door 1 (S6). The guide 5 helps guide the positioning the segmented door 1 around the rotating cylinder 4 as it is being wound. When the segmented door 1 reaches a position in which the door 1 is fully open (e.g., the open position) (S7), a switch 61 will be triggered (S8). The triggered switch 61 will signal the motor 43 to stop driving the gear head 3 (S9).

The door 1 will continue to remain in the open position for as long as the sensors 60 are receiving the signal. In some embodiments, the door can be programmed to remain open for a predetermined amount of time after the signal is lost, for example, for an amount of time determined by the user of the pet door system. Once the signal is no longer being received by the sensors 60 (S10) and any additional predetermined amount of time has passed, the motor 43 will be activated and will drive the gear head 3 in a direction counter to the direction used to open the door 1 (S11), in this case, in a counterclockwise direction. This in turn causes the rotating cylinder 4 to rotate counterclockwise (S12), the segmented door 1 to begin to unwind from the rotating cylinder 4 (S13) and the door 1 to close (S14). The guide 5 helps guide the unwinding of the segmented door 1. As a certain point during unwinding, the gravitational force acting on the portion of the segmented door 1 that has been unwound may pull the door 1 to unwind at a rate greater than the rotational velocity of the motor-driven gear head 3. To avoid this, and avoid the segmented door 1 from accelerating downwardly and potentially "slamming" shut, the current received by the motor 43 can be restricted, impeding the counter electromagnetic force and slowing the downward movement of the segmented door 1. An optical shaft encoder may be used to provide information as to where the motor shaft 42 and hence the door 1 are rotationally in order to correlate a decrease in the current sent to the motor 43 with the position of the door 1. This information may be used to program the door 1 to compensate for gravitational pull.

When the door has unwound and reached the closed position (S15), the switch 62 will trigger to indicate that the door 1 is closed (S16). The triggered switch 62 will then activate the solenoid 55 to lock the segmented door 1 (S17) and contact the gear head 3 and direct it to stop rotating. At this point, the gear head 3 stops (S18) and the process is complete. However, if the motor 43 stops generating current from its downward movement and the switch 62 indicating the closed position has not been triggered, this will indicate a position in which the segmented door 1 has stopped moving downwardly prior to the closed position, such as when there is an object, like the pet, in the door opening 37 preventing the door 1 from closing. In such a situation, the motor 43 will be triggered to open the door 1. The door 1 may fully open and attempt to close again according to the same process as above. This auto-retract feature helps prevent the pet from getting pinched or stuck in the pet door system. The door may alternatively include other sensors capable of detecting an obstruction, such as mechanical or optical sensors.

Figure 7:
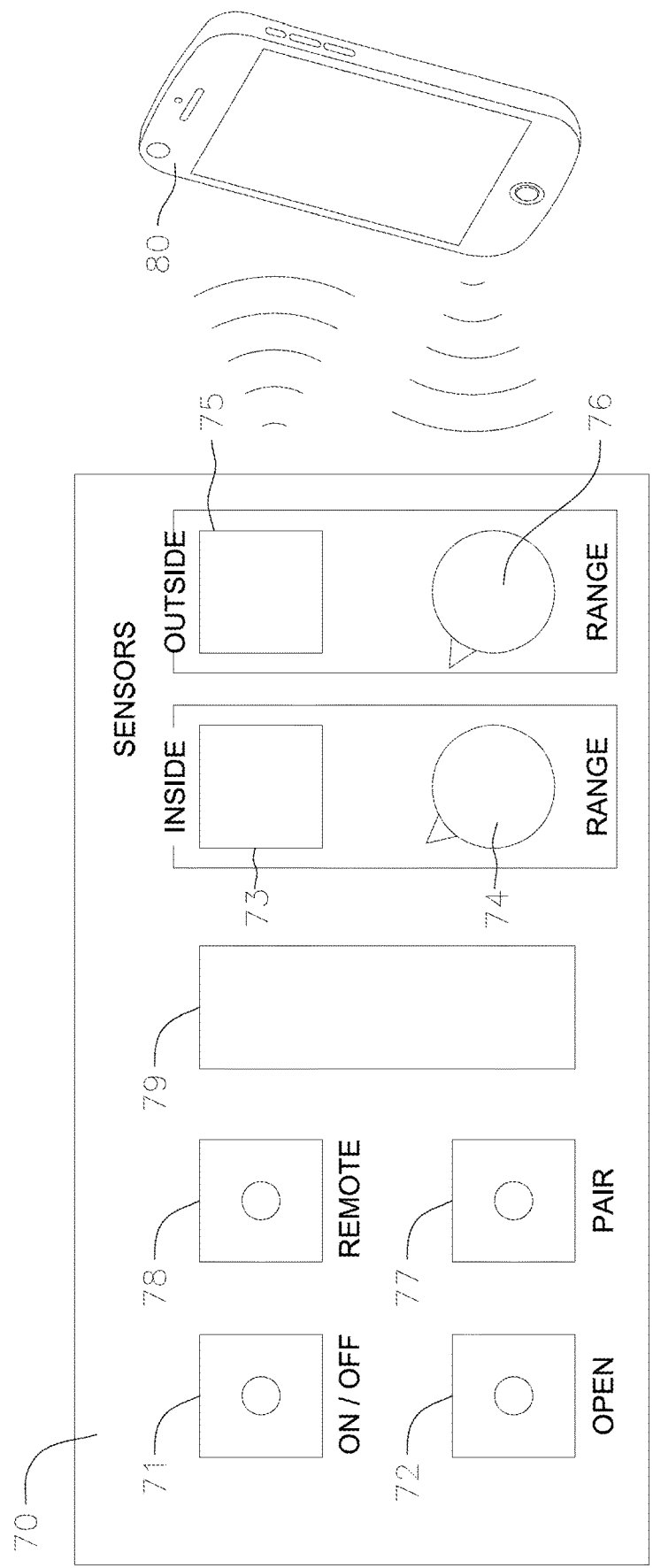
FIG. 7 is a schematic representation of a control panel on the pet door system.

FIG. 7 is a schematic representation of the control panel 70 on the pet door system. The pet door system can include a control panel, such as the one shown in FIG. 7, in order to allow the user to control various aspects of the pet door system. For example, the control panel 70 may include an on/off button 71 to turn the pet door system on and off and an open button 72 to allow the user to directly open the door 1. By holding the open button 72, or in some embodiments by holding the open button 72 in combination with another button, the user can open the door 1 such that it stays open until the user presses the open button 72 again, allowing the user to open the door 1 for extended periods of time. The control panel 70 can also include a pair button 77. The pair button 77, when pressed, allows the pet door system to read the identification information of a transmitter worn by a pet, such as a pet collar, that is in range and pairs that pet collar with the pet door system such that the pet door system will operate to open and close the door 1 in response to a signal by that pet collar. The pet door system may be capable of pairing with multiple transmitters worn by pets to allow the pet door 1 to open for more than one pet. The control panel 70 may also include addition buttons or means, or may be programmed such that a combination of buttons or means, allows the user to turn on and off pair mode. With pair mode on, the pet door system will only open for those transmitters paired with the pet door system. With pair mode off, the door 1 will open for any ultrasonic signal (or radio or magnetic signal in other embodiments) within range of the sensors 60. Additional buttons or means, or a combination of buttons or other means, may also be used to allow the user to control the amount of any predetermined time for which the door 1 will remain open after the sensors 60 lose the signal, as discussed with respect to FIG. 6 above.

The control panel 70 may include switches and/or dials to control the range of the sensors 60. For example, the control panel 70 may include an inside sensor 73 and range dial 74 for the inside sensor 73. The inside sensor 73, as part of the sensors 60, detects the signal output by the transmitter worn by the pet using the pet door system on one side of the door 1. By adjusting the dial 74, the user can control the range of the inside sensor 73, thus controlling the distance from the door 1 at which the operation of the door may be triggered. An outside sensor 75 and a range dial 76 may perform the same functions as the inside sensor 73 and range dial 74 for the opposite side of the door 1, the outside sensor 75 also being a part of the sensors 60.

Additional buttons, switches, dials, electronics, software or other means 79 may be included in the control panel 70 to provide the user with additional controls for the pet door system. In some embodiments, the control panel 70 may also include buttons, switches, dials electronics, software or other means to allow the pet door system to be connected and remotely controlled from a remote and/or mobile device 80, such as a smartphone, for example, by using an application on the remote and/or mobile device. In some embodiments, the control panel 70 can include a remote button 78 that allows the pet door system to connect to and be controlled by the remote device 80. The remote device 80 may be connected to the pet door system via Bluetooth, Wifi, or similar signals capable of connecting the remote device 80 to the pet door system. With the remote button 78 engaged, the remote device 80 will override any local settings that were set at the control panel 70 and the pet door system will instead be controlled at the remote device 80. When the remote button 78 is not engaged, the local settings will control. The remote device 80 may have an application that allows the user to control various features/aspects of the pet door system, including those features/aspects of the pet door system controlled by the control panel 70, for example, the opening and closing of the door 1. The remote device 80, in particular where the remote device 80 is a smart phone or similar device capable of high-speed, complex processing, may also include additional functionalities. For example, the remote device 80 may allow the user to control the times of day in which the pet door system is operational, limiting the times of day in which pets may open the door 1 and enter or exit the house, for example, by activating or deactivating a locking mechanism on the pet door system (see, for example, the locking mechanism described with respect to FIG. 5 above). The remote device 80 may keep a record of the number of times a specific transmitter, and thus a specific pet, enters and exits through the pet door and at what time, based on the activation of the inside and outside sensors 60 and the operation of the pet door system. Various functionalities may be incorporated to allow the user to have detailed control over the pet door system and to be provided detailed statistics regarding its operation.

Figure 8:
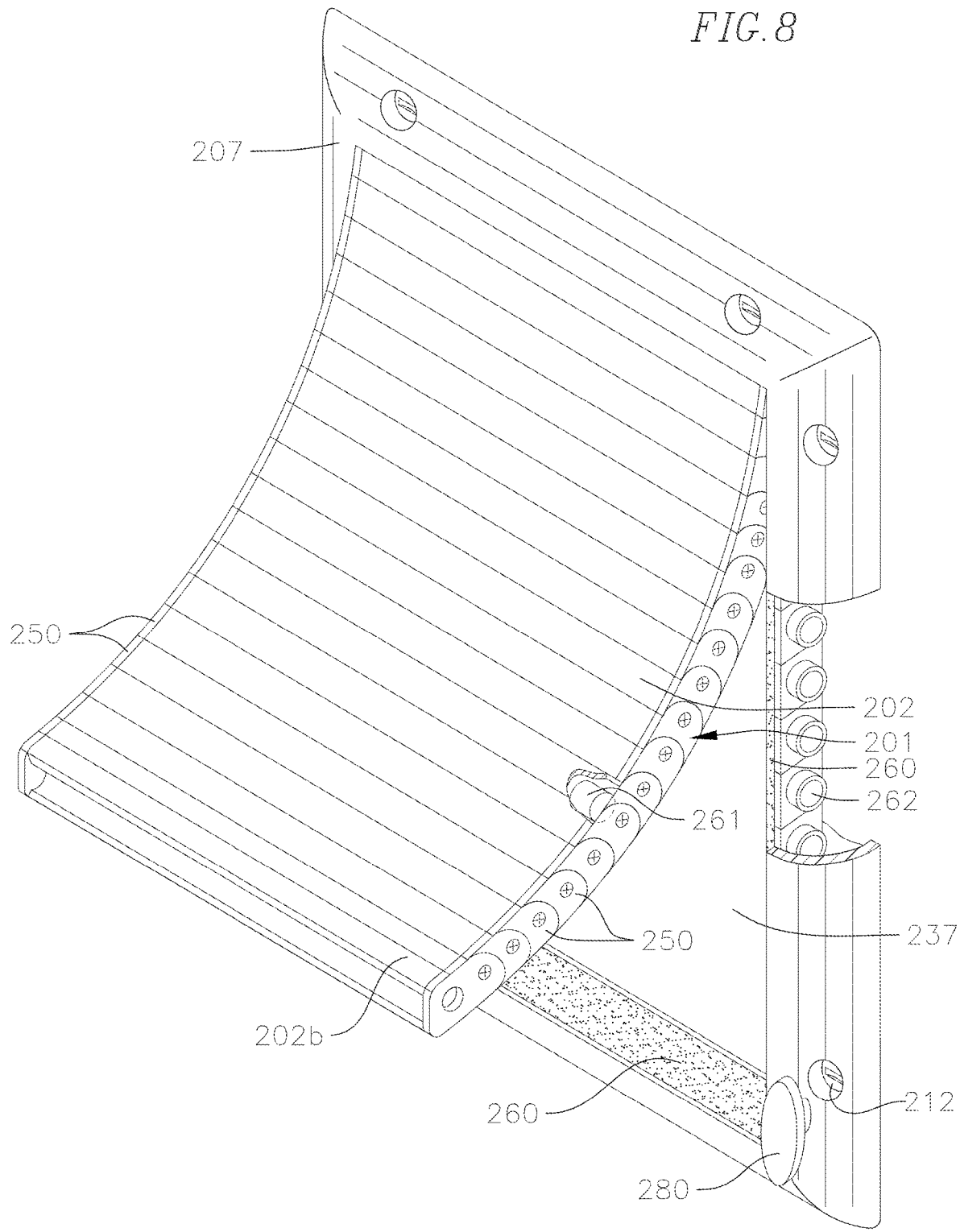
FIG. 8 illustrates a partially cut-away perspective view of a second embodiment of the pet door system.

FIG. 8 illustrates a partially cut-away perspective view of a second embodiment of the pet door system. The pet door system includes a segmented door 201 that comprises multiple individual door segments 202. The individual door segments 202 can be the same as the door segments 2 or 102 as described with respect to FIGS. 2A-3B above. However, the orientation of the door segments 202 in the second embodiment may be inverted compared to the orientation of the door segments 2, 102, as shown and described with respect to FIG. 9. The segmented door 201 is housed in a casing 207 along with all other elements of the pet door system. In this embodiment, the casing 207 surrounds the entire segmented door 201. However, in other embodiments, the casing 207 may only partially surround the door 201. The casing 207 includes at least one frame or bezel 209 that attaches to at least one side of a door or wall of a building (e.g., as the door or wall of a house or apartment) and the bezel 209 can be attached to the door or wall via an attachment means, such as screws 212. The bezel 209 defines a door opening 237 into which the segmented door 201 is movably mounted. The segmented door 201 acts as a flap and can move in and out of the plane of the casing 207 to allow entry or exit of a pet.

The inside surface of the casing 207 that surrounds the door opening 237 can be lined with a seal 260, for example a felt seal, to prevent or reduce air from traversing between the segmented door 201 and the casing 207 for insulation, to reduce noise from traversing from one side of the door 201 to the other and/or to prevent the segmented door 201 from rubbing against the casing 207. In other embodiments, the seal 260 may instead include Teflon pads.

Figure 10:
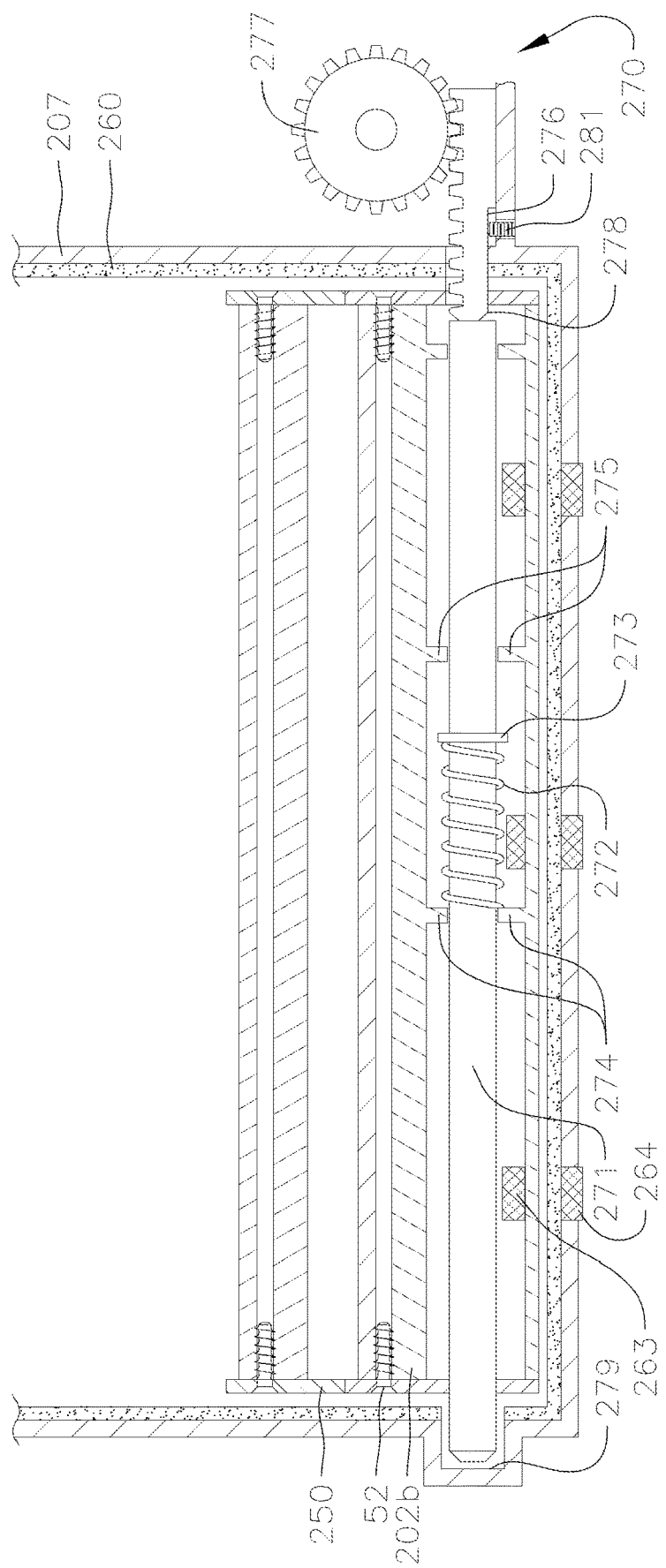
FIG. 10 is a sectional front view of a locking mechanism of the pet door system of FIG. 8.

As shown in FIG. 10, the casing 207 may include a locking mechanism 270 that functions to lock a bottom segment 202b of the segmented door 201 in order to lock the segmented door 201. In this embodiment, the bottom segment 202b includes a rod 271 that is spring biased by spring 272 to remain inside the bottom segment 202b until acted upon by the locking mechanism 270. As shown, the rod 271 is encircled by the spring 272 and the spring 272 is located between a retaining ring 273 and internal walls 274 and 275 of the bottom segment 202b. The retaining ring 273 may be seated in a groove in the rod 271 in order to attach the retaining ring 273 to the rod 271. At one end of the rod 271 is a rack 276 and pinion 277 that form the locking mechanism 270. The rack 276 can be preferably substantially cylindrical in shape and can pass through openings in the casing 207, the felt seal 260 and the end cap 250 to contact the rod 271. At the other end of the rod 271 is a recess 279 in the casing 207 that is shaped to accommodate the end of the rod 271 when acted upon by the locking mechanism 270.

The locking mechanism 270 may be operated by a user turning the handle 280 (shown in FIG. 8), which is mechanically connected to the locking mechanism 270. When the handle 280 is turned in a clockwise direction, for example, the pinion 277 rotates causing an end 278 of the rack 276 to contact the rod 271 and push the rod 271 into the recess 279 of the casing 207, allowing the door 1 to be locked on one side of the door by the rack 276 and the other side by the rod 271, thus locking the segmented door 1. A set screw 281 can be included adjacent the rack 276 to prevent the rack 276 from being detached from the pinion 277 if a user attempts to turn the handle 280 past the locked position. In addition, the locking mechanism 270 may also include a spring-loaded or ball detent to help hold the locking mechanism 270 in place when it is in the locked position.

In other embodiments, the pet door system may include any other suitable locking mechanism to lock the segmented door 201 in the closed position in order to prevent or hinder intruders from forcing the door 201 open. The locking mechanism may be, for example, a solenoid control, an electromechanical lock, or another mechanical lock that locks the segmented door 201 when the door 201 is at the bottom of the door opening 237 (i.e., in the closed position). The locking mechanism may be manually engaged by a human or may be remotely controlled by a transmitter, such as a mobile phone or a pet worn transmitter.

In the segmented door 201, each individual segment 202 may include end caps 250 that can be attached to respective side ends of the individual segments 202 after the individual segments 202 are connected to form the segmented door 1. The end caps 250 may be the same or substantially the same as the ends caps 50 and 150 described with respect to FIGS. 2D and 3B, respectively. A topmost segment 202a of the segments 202, shown in FIG. 9, may not include an end cap 250 but may instead be connected to the casing 207 via a rod and/or screws to fixedly attach the segmented door 201 to the casing 207. For example, screws or a rod can be installed into a hollow portion 236 of a projection 224 of the topmost door segment 202a to attach the segmented door 201 to the casing 207.

Figure 9:
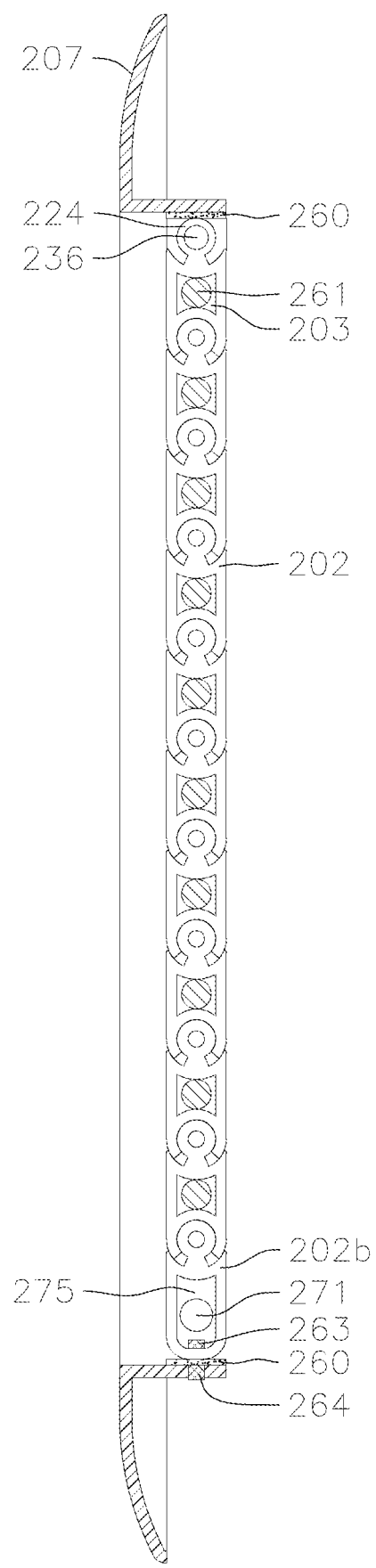
FIG. 9 illustrates a cross-sectional view of the pet door system of FIG. 8.

As shown in FIGS. 8 and 9, individual segments 202 may include magnets 261, such as disk magnets, that correspond to complementary magnets 262, such as complementary disk magnets, in the casing 207. The disk magnets 261 may be housed in a hollow channel 203 of the individual segments 202. The disk magnets 261 of the door 201 interact with the disk magnets 262 in the casing 207 to hold the segmented door 201 in the plane of the casing 207 when the door 201 is not in use by the pet. The interaction of the disk magnets 261 and 262 provides sufficient force to hold the door 201 in the closed position, for example, against the force of the wind, but is easily overcome by the force of a small animal pressing against the door 201 to allow it to pass through the door opening 237. Each individual segment 202 may include a disk magnet 261 with a line of disk magnets 262 aligned within the casing 207 to correspond to the disk magnets 261. However, in some embodiments, each segment 202 need not include a disk magnet 261. For example, disk magnets 261 may be included in a subset of the individual segments 202 spaced throughout the vertical length of the door 201, with corresponding disk magnets 262 in the casing 207, as long as the number of disk magnets 261, 262 provide sufficient force to maintain the segmented door 201 in the closed position when the pet door system is not in use and allow the door 201 to open when a pet pushes on it. For example, every second or third individual segment 202 may include a disk magnet 261, with the casing 207 having corresponding disk magnets 262 aligned with those disk magnets 261. The force created by the interaction between the disk magnets 261 and 262 should not be so strong that the pet cannot push the segmented door 201 open.

Additional bottom magnets 263 may be included in the bottom segment 202b of the door 201 and corresponding complementary bottom magnets 264 may be included in the casing 207 adjacent the bottom segment 202b in order to provide additional force to hold the bottom of the door 201 in the closed position, for example, as shown in FIGS. 9 and 10. The bottom magnets 263, 264 may be spaced across the bottom of the door 201 to provide substantially equal force across the bottom of the door 201. Like the disk magnets 261, 262, the interaction of the bottom magnets 263 and 264 should provide sufficient force to hold the door 201 in the closed position, for example, against the force of the wind, but is easily overcome by the force of a small animal pressing against the door 201 to allow it to pass through the door opening 237. The additional bottom magnets 263, 264 may aid in aligning the door for locking with a locking mechanism positioned at the bottom of the door 201, such as the locking mechanism 270.

In use, the pet door system of the second embodiment is a simple non-motorized door that allows a pet to enter and exit through the door by pushing the segmented door 201 so that the magnetic force between the disk magnets 261 and 262 breaks and the segmented door 201 flaps open. A user may also lock the segmented door 201 in a closed position with the locking mechanism 270 to prevent the door 201 from opening.

Figure 11:
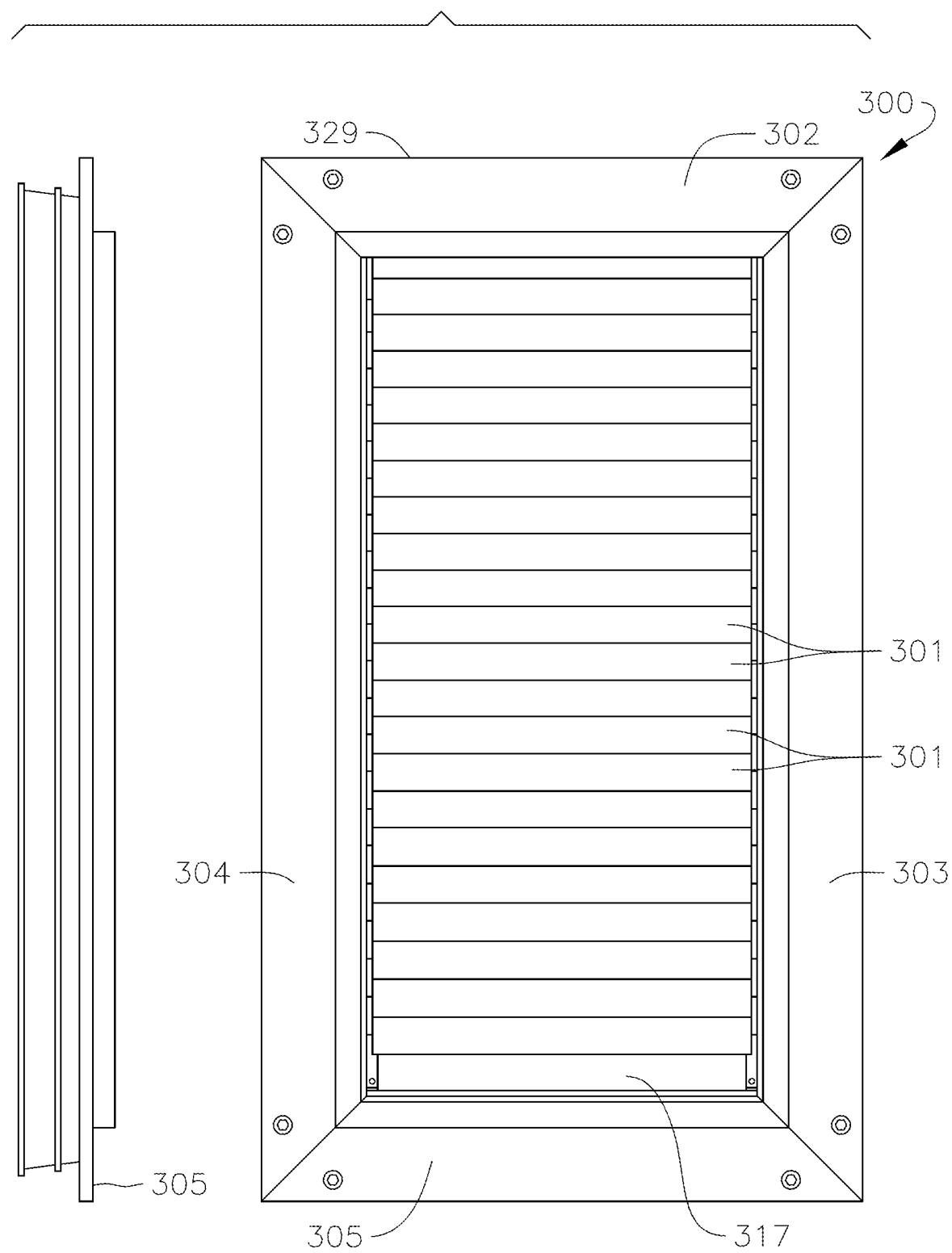
FIG. 11 is a front and left side view of another embodiment of the door system with a longitudinal section view.
Figure 13:
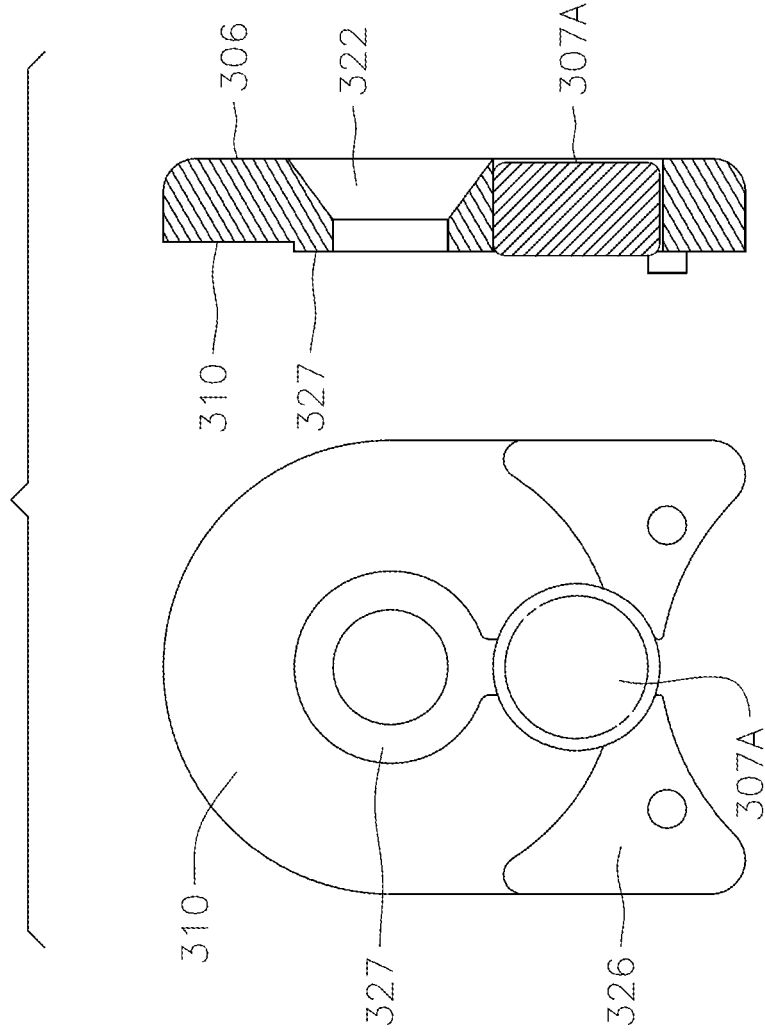
FIG. 13 is a rear view of the end cap with longitudinal cross-sectional view.
Figure 12:
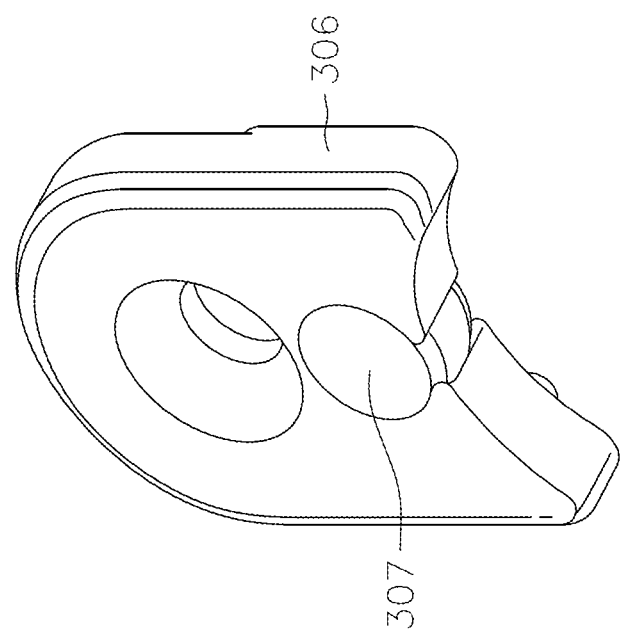
FIG. 12 is a perspective detail view of a stepped end cap with a magnet.
Figure 14:
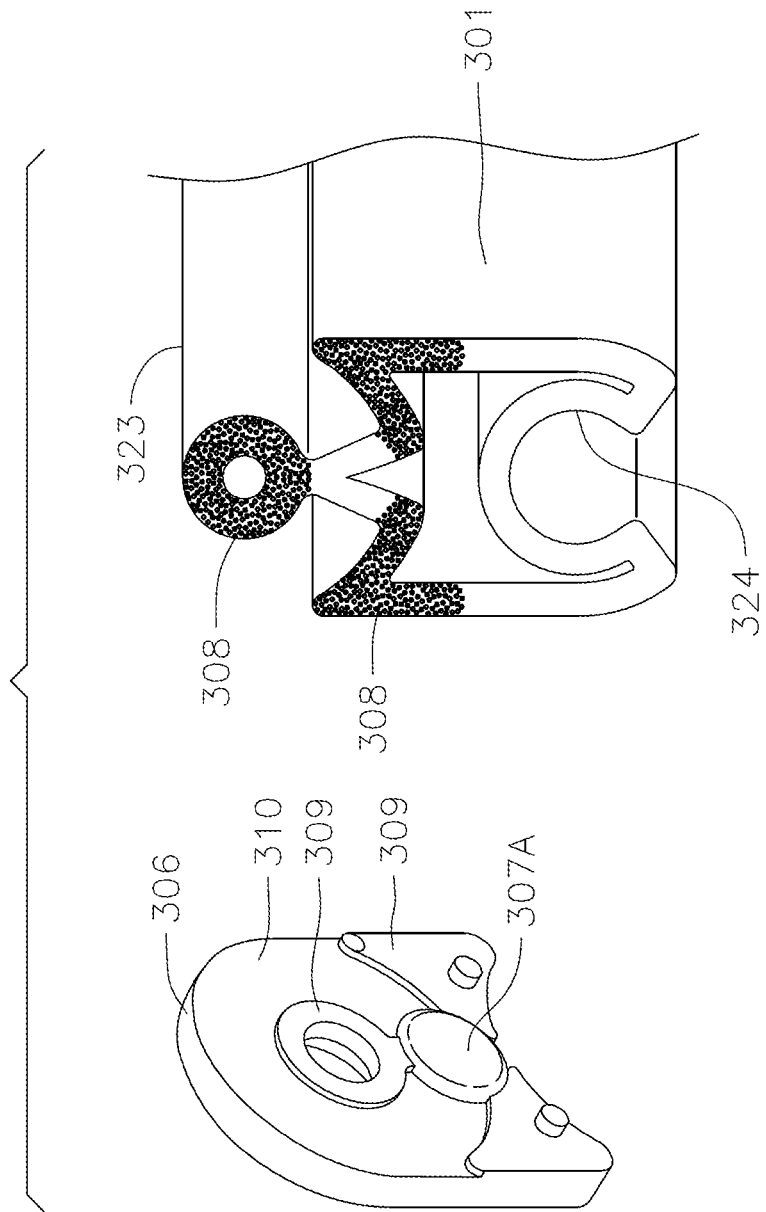
FIG. 14 is a perspective view of the end cap and a door segment with shaded areas showing areas of contact.
Figure 15:
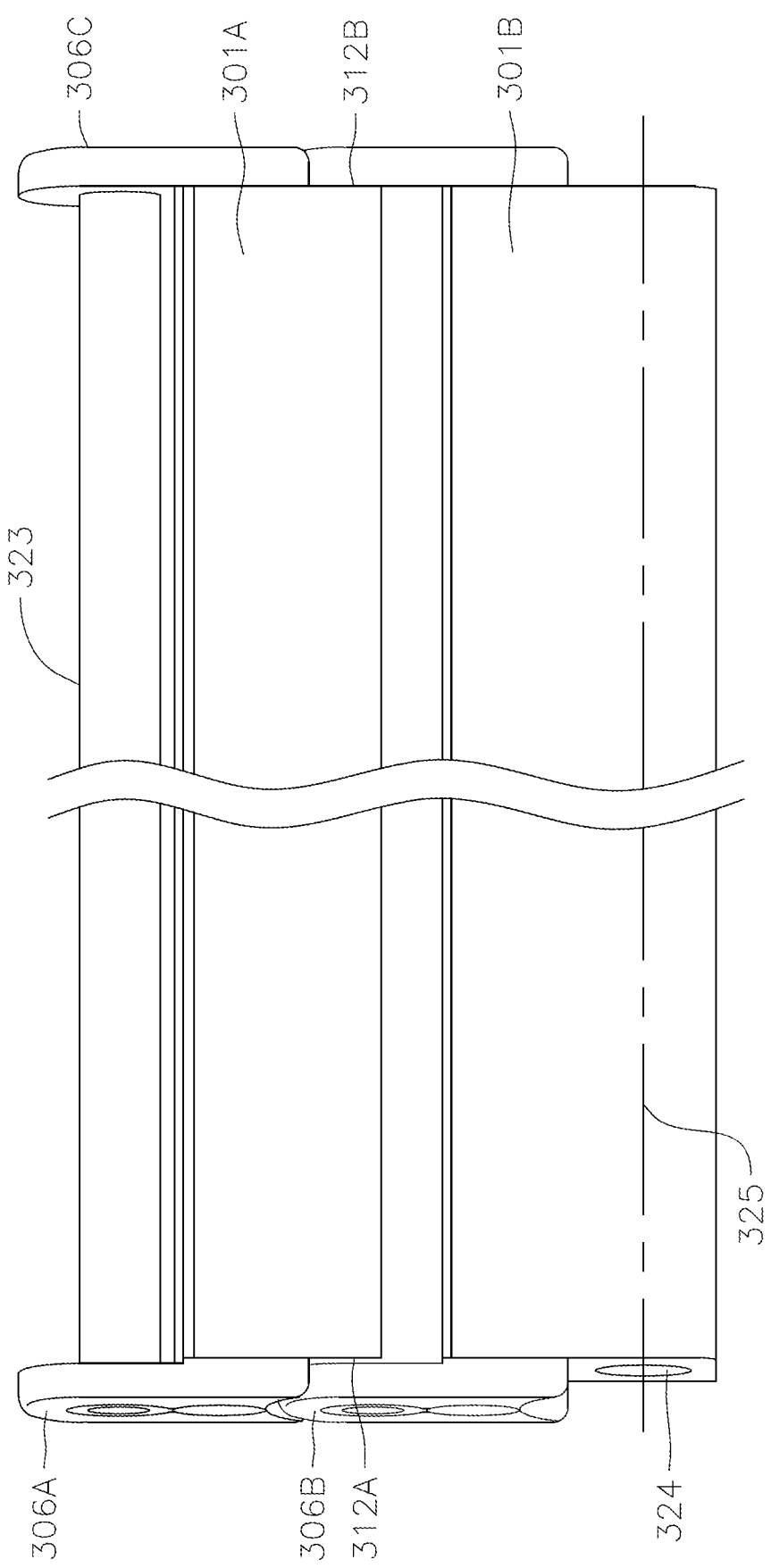
FIG. 15 is a end cap and door segment assembly showing typical pivoting connection between door segments.
Figure 16:
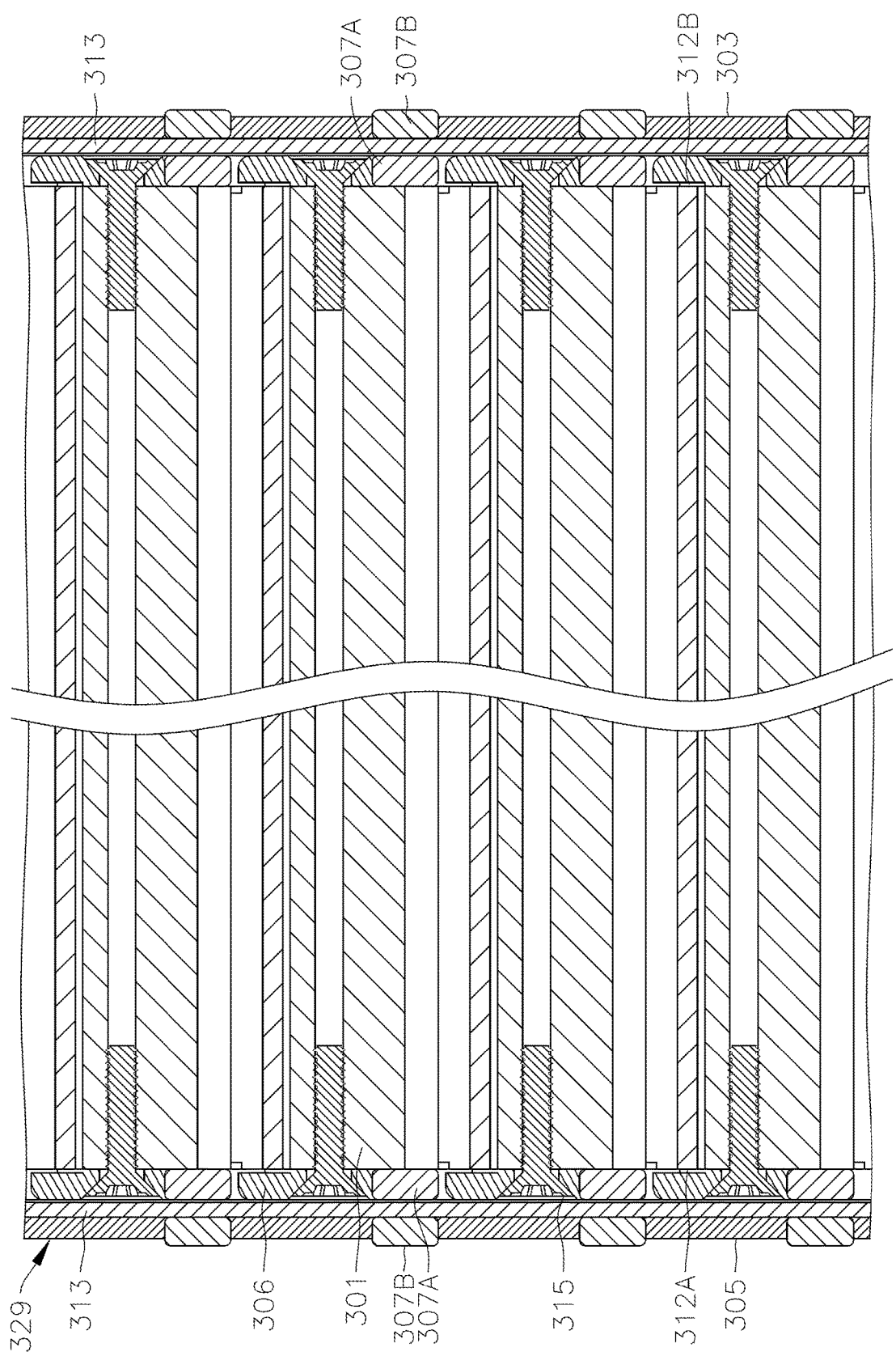
FIG. 16 is a cross-sectional view of door assembly taken along line B-B of FIG. 11 showing magnet alignment.

FIG. 11 shows a door assembly 300 comprised of identical rotatably interlocking door segments 301 and bottom door segment 317 housed within casing 329 comprised of top member 302, right side member 303, left side member 304 and bottom member 305. The door segments 301 are prevented from separating along an axis perpendicular to the axis of rotation, herein called vertical, by their interlocking design shown in more detail in FIGS. 17A and 17B. Door segment 301 is constructed with a substantially cylindrical protrusion 323. Door segment 301 also possesses a substantially cylindrical cavity 324. Multiple door segments 301 may be assembled together such that protrusion 323 of one door segment 301 may be slid into cavity 324 of another door segment 301. FIG. 15 shows a coaxial pivotal connection wherein multiple door segments 301 pivot relative to one another about axis of rotation 325. Cylindrical protrusions and cavities 323 and 324 must have a partial cylindrical geometry of greater than 180 degrees in order to prevent separation in a direction perpendicular to cylindrical axis 325 (vertical direction). They are prevented from separating slidably in a direction parallel to axis 325, referred to herein as the horizontal direction, by end caps 306. FIGS. 12, 13 and 14 show detail views of end cap 306 containing a disk magnet 307. FIG. 16 shows end caps 306 fastened to each end of door segments 301 by means of flat head screws 315. In order to allow for free pivotal motion between door segments 301, end cap 306 contains stepped surfaces 310 and 326. FIG. 13 shows end cap 306 with co-planer surfaces 326 and 327 and surface 310 which is offset to create a gap between it and an interlocking door segment.

To further illustrate, FIG. 14 shows the area of contact between end cap 306 and its mating door segment 301. Shaded areas 308 and 309 show the area of contact between the end cap 306 and door segment 301. Recessed surface 310 creates a gap wherein a pivotally interlocking door segment may freely rotate. FIG. 15 shows end cap 306A in rigid contact with door segment 301A. End cap 306B is in rigid contact with interlocking door segment 301B. The stepped surfaces of end cap 306B creates gap 312A between end cap 306B and door segment 301A so that it does not imped the rotation of segment 301A. A similar gap 312B is created on the opposite side in similar fashion by reason of the stepped surfaces of the end caps. The pattern is repeated as additional door segments are added to increase the height of door assembly 300. Each door segment is rigidly fixed to end caps on either of its sides, said end caps having stepped surfaces allowing the interlocking door segment to freely rotate about the cylindrical axis. Screw 15 may thereby, be tightened with high torque to allow for a strong, non-rotating connection between end cap and door segment while allowing the interlocking door segment and end caps affixed to that interlocking door segment to rotate freely.

FIG. 17A shows a cross section of free hanging door assembly 300 when removed from its casing. The free hanging assembly has a total height of H1. The cylindrical diameter of cavity 324 must be greater than the cylindrical diameter of protrusion 323 to allow for a free rotating clearance fit. Under the force of gravity, each segment must make contact with the segment above at the points where its protrusion 323 rests upon the walls of cavity 324 leaving a gap C1 between protrusion 323 and cavity 324. Referring to FIG. 11, without further enhancement, accomplishing a good fit between the height of door assembly 300 and the internal height of casing 329 is impractical. For example, a cost efficient manufacturing process, such as plastic or metal extrusion, necessarily carries with it manufacturing tolerances for the diameters. For a plastic material it would be difficult to control each diameter to an accuracy of better than plus or minus 0.010 inches. For a material such as aluminum, a very carefully controlled manufacturing process might allow control of each diameter to typically plus or minus 0.005 inches. Referring to FIG. 17A, this is a degree to which it is practical to control the spacing distances L2 between door segments 301. Since the overall height H1 of the interlocking door segments will vary by the accumulation of each individual tolerance, the potential variation in height would be at least 0.010 times the number of segments. To achieve a reasonable flexibility in door assembly 300, a spacing distance L1 of about 1 inch between door segments 301 would be typical. Therefore, for a door assembly only 12 inches high, it would be difficult to control its overall height to within 0.12 inches. For a 24 inch high door assembly the potential variation would be twice that and for a door assembly made of plastic, twice that again. Such a variation presents potential failure due to an overlapping fit or an air gap between the bottom door segment and the bottom of casing 329.

Figure 18A:
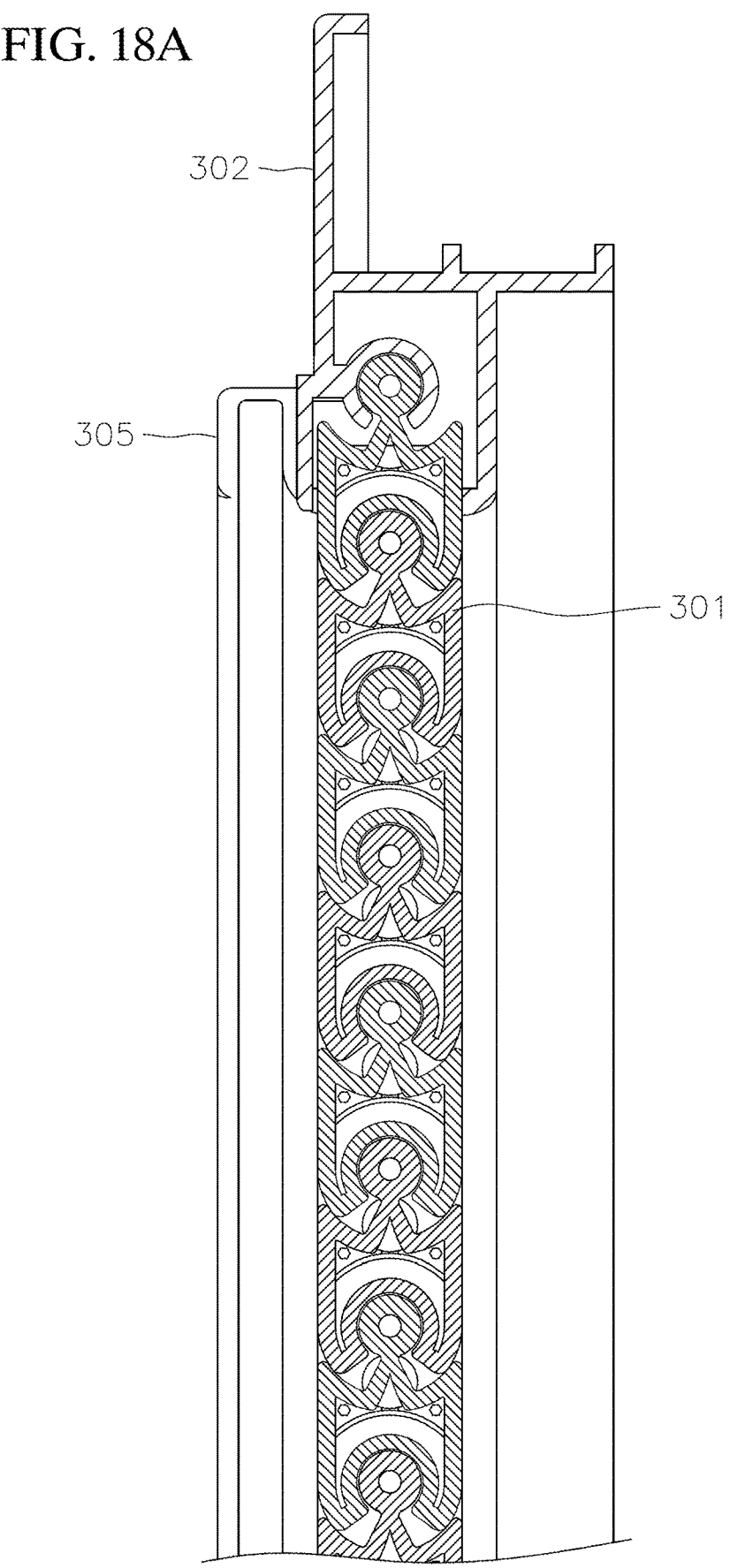
FIG. 18A is a cross-sectional view of the door in a closed position.
Figure 18B:
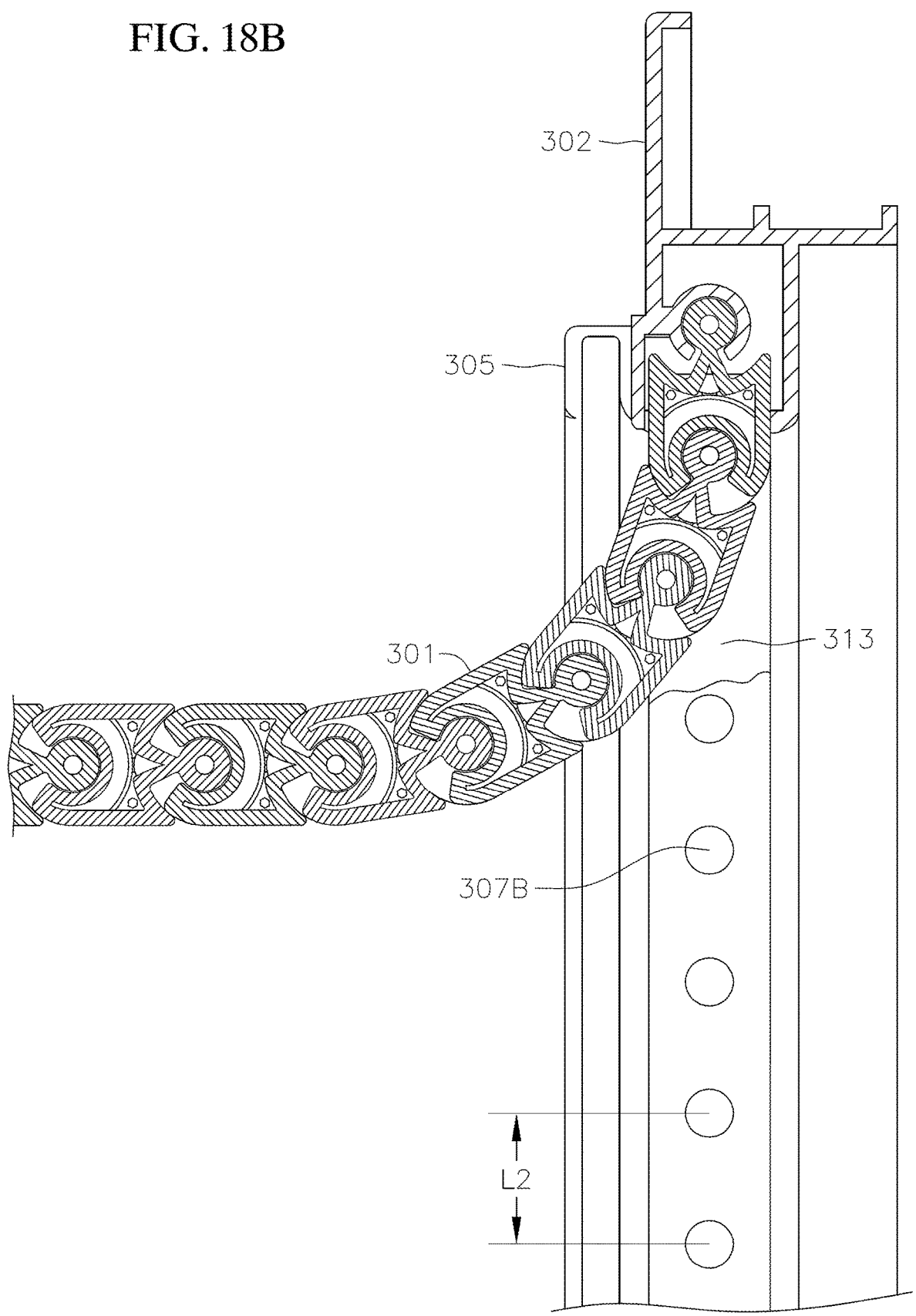
FIG. 18B is a cross-sectional view of the door in an open position

The door assembly of the current invention encompasses embodiments that solve this problem in several different ways. FIG. 16 illustrates a cross-sectional view of door assembly 300 and casing 329 along cutting plane B-B of FIG. 11. Disk magnets 307A are inserted in each or in selected end caps 306 which align with disk magnets 307B in the casing and are separated by a vertical compressible seal 313. Disk magnets 307B are inserted into drilled holes in casing left and right side members 305 and 303. Using common manufacturing techniques, the drilling process may be controlled with no accumulation of tolerances. By orienting disk magnets 307A and 307B so that their poles will attract, the magnets 307A in end caps 306 will be pulled into vertical alignment with the casing magnets 307A. Because the magnets in casing members 305 and 303 are precisely spaced, the accumulation of tolerances in the manufacture of door segments 301 is eliminated yielding precisely spaced door segments 301 as shown in FIG. 17B. The spacing L2 between door segments 301 is precisely that of the drilled holes in casing members 305 and 303 resulting in a more precisely controlled overall height H2. The variance of overall height H2 is equal to the manufacturing tolerance of the last segment only. To achieve this in practical design one need only make sure that hole spacing L2, as seen in FIGS. 17B and 18B is less than L1 and greater than L1-C1.

Figure 19:
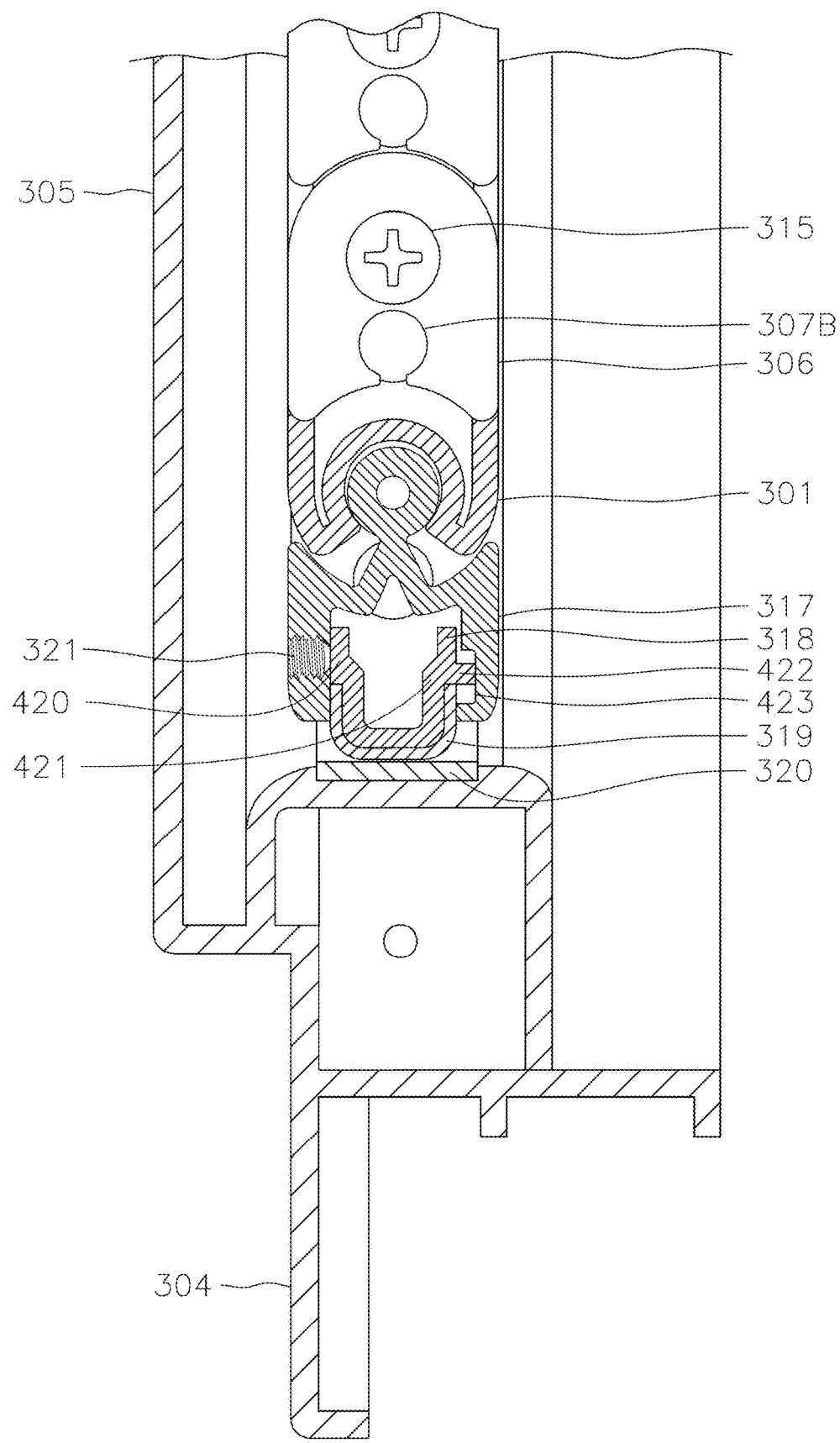
FIG. 19 is a cross-sectional side view of the door assembly showing an adjustable bottom door segment.

Another solution within the scope of the current invention is shown in FIG. 19 wherein a U-shaped height adjustable element 318 with a first portion 420 and a second portion 421 spaced from the first portion, and a soft cushion 319, preferably made of rubber, is placed within a cavity in bottom segment 317 and held in position by a set screw 321 height is adjusted by flange 422 projecting from second portion 421 and extending into channel 423 in bottom rotatably interlocking segment 317 and set screw 321 engaging first portion 420. For optimal sealing, a compressible seal 320 is mounted in bottom casing member 304. This provides for a soft closure of door assembly 300 and prevents the flow of air between soft cushion 319 and compressible seal 320.

Figure 20:
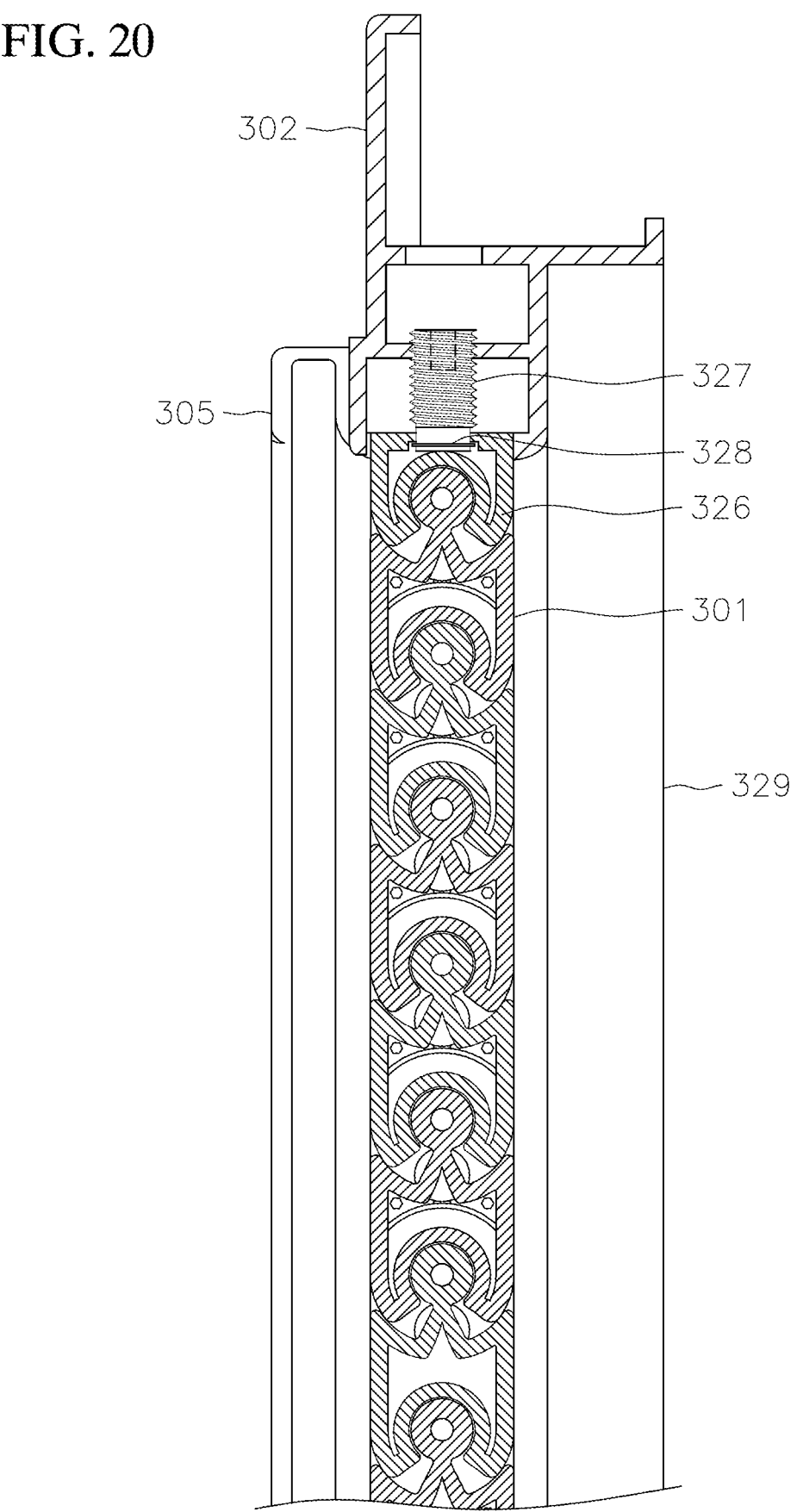
FIG. 20 is a cross-sectional side view of the door assembly showing means to adjust the vertical position of the door assembly within the casing.

Yet another solution is shown in FIG. 20 wherein, door assembly 300 may be raised and lowered within casing 329 by means of an adjustment shaft 327. Adjustment shaft 327 is partially threaded and inserted into a threaded hole in casing top member 302. Threads at one end of adjustment shaft 327 are undercut so that it may rotate freely within a counter-bored hole in modified top door segment 326. A retaining ring 328 couples adjustment shaft 327 to modified top door segment 326 so that door assembly 300 moves vertically as adjustment shaft 327 is rotated allowing compensation for any overlap or gap between door assembly 300 and casing 329.

Another advantage of the current invention is that there is no need for a pivotal seal between the top of door assembly 300 and casing 329. As shown in FIGS. 18A and 18B, top member 301C may be stationary and sealed statically by reason of its attachment to casing top member 302 since the interlocking segments 301 together form a unit that is flexible in the vertical direction, top door segment 301C need not rotate to allow an animal to pass through the opening.

Any features of embodiments of the invention described as including switches, buttons, or likewise can be instead buttons, switches, dials or other means within the scope of the invention. Also, like reference numbers refer to like elements throughout.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. A door for an animal comprising:
a casing; and
a door assembly contained within the casing;
the door assembly comprises :
a plurality of rotatably interlocking segments such that the door assembly is rigid in a direction along an axis of rotation of the interlocking segments and flexible in a direction perpendicular to the axis of rotation of the interlocking segments; and
a plurality of end caps for preventing horizontal sliding of the interlocking segments relative to one another, a first end cap of the plurality of end caps is attached to a first end of a first interlocking segment of the plurality of interlocking segments and a second endcap of the plurality of endcaps is attached to a second opposite end of the first interlocking segment of the plurality of interlocking segments at an interlocking juncture between the first interlocking segment and an adjacent second interlocking segment of the plurality of rotatably interlocking segments,
wherein the first and second end caps each have a stepped surface including a first surface which engages the first and second ends, respectively, of the first individual interlocking segment at the interlocking juncture and a recessed surface spaced away from the first end and the second opposite ends, respectively, of the adjacent second individual interlocking segment at the interlocking juncture to allow free rotation between the first interlocking segment and the adjacent second interlocking segment at the interlocking juncture.

2. The door of claim 1, wherein each end cap of the plurality of end caps has a magnet.

3. The door of claim 1, wherein the casing has a plurality of magnets spaced along side casing members of the casing.

4. The door of claim 3, wherein the magnets in the side casing members are aligned with magnets positioned in the plurality of end caps.

5. The door of claim 1, wherein a bottom rotatably interlocking segment of the plurality of rotatably interlocking segments includes a height adjustable element positioned within a cavity in the bottom rotatably interlocking segment.

6. The door of claim 5, wherein the height adjustable element includes a cushion.

7. The door of claim 1, further comprising a seal positioned in a lower casing member under the door assembly.

8. The door of claim 1, further comprising an adjustment shaft attached at one end to an upper casing member and at an opposite end to a top interlocking segment of the plurality of rotatably interlocking segments to adjust a height of the door assembly within the casing.

9. The door of claim 4, wherein a compressible seal is positioned in the side casing members between the magnets in the side casing members and the magnets in the end caps.

10. A door for an animal comprising:
a casing having a top casing member; and
a door assembly contained within the casing,
the door assembly comprising a plurality of rotatably interlocking segments such that the door assembly is rigid in a direction along an axis of rotation of the interlocking segments and flexible in a direction perpendicular to the axis of rotation of the interlocking segments, a top interlocking segment of the plurality of rotatably interlocking segments non-rotatably fixed to the top casing member of the casing, and an adjustment shaft threadedly attached at one end to the top casing member and freely rotatably attached at an opposite end to the top interlocking segment to adjust a height of the door assembly within the casing by rotation of the adjustment shaft.

11. The door of claim 10, wherein the door assembly further comprises a plurality of end caps for preventing horizontal sliding of individual interlocking segments of the plurality of rotatably interlocking segments, wherein each individual interlocking segment has an end and an opposite end, and an end cap of the plurality of end caps is positioned on the end and another end cap of the plurality of end caps is positioned on the opposite end of each interlocking segment, each end cap of the plurality of end caps having a stepped surface including a first surface which engages the end and the opposite end of the interlocking segment and a recessed surface spaced away from the end and the opposite end of the interlocking segment to allow free rotation of the interlocking segment not engaging the first surface of each end cap.

12. The door of claim 10 further comprising means to align the door assembly within the casing is a magnet positioned at an end of two or more interlocking segments of the plurality of rotatably interlocking segments which are aligned with a corresponding magnet positioned along a side casing member to individually position the two or more interlocking segments in the casing.

* * * * *